US007764238B2

(12) United States Patent
Hotta et al.

(10) Patent No.: US 7,764,238 B2
(45) Date of Patent: Jul. 27, 2010

(54) ANTENNA DEVICE AND ELECTRONIC EQUIPMENT

(75) Inventors: Hiroyuki Hotta, Hamura (JP); Masao Teshima, Kunitachi (JP); Koichi Sato, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/415,513

(22) Filed: Mar. 31, 2009

(65) Prior Publication Data

US 2010/0026602 A1 Feb. 4, 2010

(30) Foreign Application Priority Data

Jul. 29, 2008 (JP) ............... 2008-195529

(51) Int. Cl.
*H01Q 1/24* (2006.01)
(52) U.S. Cl. .............. 343/702; 343/700 MS; 343/846
(58) Field of Classification Search ......... 343/700 MS, 343/702, 829, 843, 846
See application file for complete search history.

(56) References Cited

U.S. PATENT DOCUMENTS

| | | | | |
|---|---|---|---|---|
| 5,434,579 | A * | 7/1995 | Kagoshima et al. ... | 343/700 MS |
| 6,297,776 | B1 * | 10/2001 | Pankinaho ........... | 343/700 MS |
| 6,686,886 | B2 * | 2/2004 | Flint et al. .................. | 343/702 |
| 7,026,999 | B2 | 4/2006 | Umehara et al. | |
| 7,425,924 | B2 * | 9/2008 | Chung et al. ................ | 343/702 |
| 2005/0110692 | A1 * | 5/2005 | Andersson .................. | 343/702 |
| 2009/0009401 | A1 * | 1/2009 | Suzuki et al. ......... | 343/700 MS |

FOREIGN PATENT DOCUMENTS

| | | |
|---|---|---|
| JP | 2003-124742 | 4/2003 |
| JP | 2003-158419 | 5/2003 |
| JP | 2003-168916 | 6/2003 |
| JP | 2003-218623 | 7/2003 |
| JP | 2004-201278 | 7/2004 |
| JP | 2005-094501 | 4/2005 |
| JP | 2005-252480 | 9/2005 |
| JP | 2007-028255 | 2/2007 |
| JP | 3959396 B2 | 8/2007 |
| JP | 2008-028734 | 2/2008 |
| JP | 2008-066779 | 3/2008 |
| JP | 2008-092311 | 4/2008 |
| JP | 2008-167467 | 7/2008 |

* cited by examiner

*Primary Examiner*—Tho G Phan
(74) *Attorney, Agent, or Firm*—Blakely, Sokoloff, Taylor & Zafman LLP

(57) ABSTRACT

According to one embodiment, an antenna device includes a short circuit path, a first open-ended element, a feed side element, a second open-ended element, and a short circuit element. One end of the short circuit path is connected to a ground point near a feed point. The first open-ended element extends from another end of the short circuit path. The feed side element extends from near the feed point in a direction in which the first open-ended element extends with an edge close to ground. The second open-ended element extends from near an end of the feed side element in the direction in which the first open-ended element extends. The short circuit element connects between an end of the first open-ended element and a point on an edge of the feed side element opposite the edge close to the ground or a point on the second open-ended element.

10 Claims, 23 Drawing Sheets

SMITH CHART: 700 MHz TO 2500 MHz

WITHOUT FEED SIDE ELEMENT

WITH FEED SIDE ELEMENT

OUTER CONDUCTOR CAN BE SOLDERED
TO SHORT CIRCUIT PATH

SMITH CHART: 700 MHz TO 1200 MHz

SMITH CHART: 700 MHz TO 1200 MHz (1) 860 MHz
(3) 855 MHz
(2) 840 MHz
(4) 835 MHz

SMITH CHART: 700 MHz TO 1200 MHz

SMITH CHART: 700 MHz TO 2500 MHz

ANTENNA DEVICE AND ELECTRONIC EQUIPMENT

CROSS-REFERENCE TO RELATED APPLICATIONS

This application is based upon and claims the benefit of priority from Japanese Patent Application No. 2008-195529, filed Jul. 29, 2008, the entire contents of which are incorporated herein by reference.

BACKGROUND

1. Field

One embodiment of the invention relates to an antenna device and electronic equipment.

2. Description of the Related Art

Recently, instead of whip antennas that have been widely used, built-in antennas are increasingly being used as wireless communication antennas for electronic equipment capable of wireless communication such as notebook personal computers (PCs). Such a built-in antenna has antenna elements built in the housing, and therefore is easily handled when used or stored compared to the whip antenna. Moreover, the housing can be designed more flexibly.

In electronic equipment having a built-in antenna, due to the miniaturization of the housing, it is often the case that the antenna elements are arranged near metal part such as peripheral circuits mounted on the circuit board. This may lower the input impedance of the antenna and thus may cause an impedance mismatch between the antenna and the feed circuit, resulting in degraded performance.

Accordingly, a folded monopole antenna is used to prevent a decrease in the input impedance of the built-in antenna.

With the folded monopole antenna, the input impedance of the antenna can be increased compared to that of a monopole antenna, and can also be adjusted by the ratio between the diameters of parallel lines. On the other hand, the folded monopole antenna is likely to be larger than a monopole antenna, and therefore requires elaborate arrangement, such as to wire the antenna elements in three dimensions, to be built in small electronic equipment.

Japanese Patent Application Publication (KOKAI) No. 2003-158419 discloses a conventional technology that enables resonance to occur at a plurality of resonant frequencies by adding an antenna to a conventional inverted-F antenna.

FIG. 50 is a schematic diagram of an antenna designed referring to the basic structure of an inverted-F antenna according to the conventional technology. As illustrated in FIG. 50, the inverted-F antenna comprises a radiation conductor (36 mm) 1, a ground conductor 2, a short circuit element (8 mm) 3, a feed line 5, and a feed conductor (80 mm) 6. The radiation conductor 1 is located opposite the ground conductor 2. The short circuit element 3 connects between the radiation conductor 1 and the ground conductor 2. The feed line 5 extends between the radiation conductor 1 and the ground conductor 2 and is connected to a feed point 4 spaced apart by 1 mm from a ground point at which the short circuit element 3 is connected to the ground conductor 2. The feed conductor 6 is connected to the feed line 5. The radiation conductor 1 and the feed conductor 6 are supplied with power via the feed line 5.

FIG. 51 is a Smith chart of the impedance variation of the inverted-F antenna illustrated in FIG. 50. The Smith chart of FIG. 51 represents variations in the input impedance of the inverted-F antenna when the frequency signal fed from the feed point 4 is changed in a range of 700 to 2500 MHz. As illustrated in FIG. 51, the plot of the impedance of the inverted-F antenna deviates upward from the centre of the Smith chart, i.e., 50Ω.

This is because the inductivity of the input impedance increases due to current flowing from the feed point 4 to the ground point as indicated by an arrow in FIG. 50. As a result, an impedance mismatch may occur at a desired frequency band.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
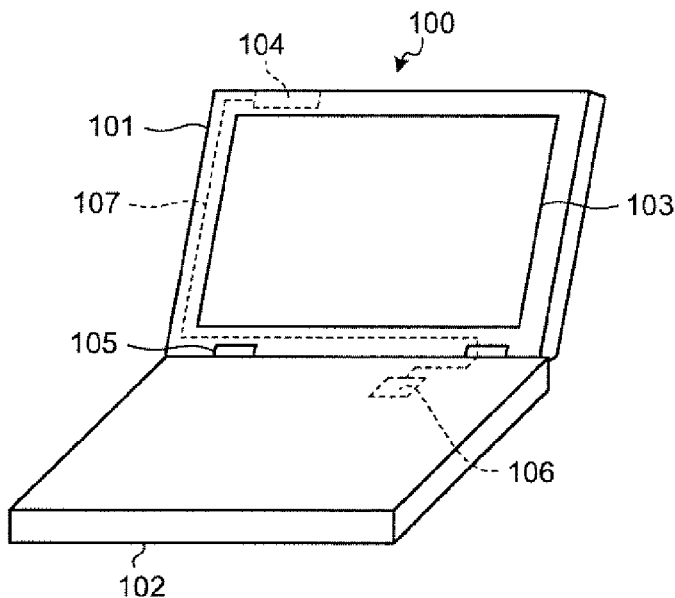
FIG. 1 is an exemplary perspective view of a notebook PC according to a first embodiment of the invention.

Various embodiments according to the invention will be described hereinafter with reference to the accompanying drawings. In general, according to one embodiment of the invention, an antenna device comprises: a short circuit path a first end of which is connected to a ground point that is located near a feed point; a first open-ended element that has a second end being open, and extends from a second end of the short circuit path; a feed side element that extends from near the feed point in a direction in which the first open-ended element extends to have an edge close to ground; a second open-ended element that is connected to the feed side element, has a second end being open, and extends from a contact point connected to the feed side element in the direction in which the first open-ended element extends, the contact point being a second end of the feed side element; and a short circuit element that connects between a first end of the first open-ended element and either a point on an edge of the feed side element opposite the edge close to the ground or a point on the second open-ended element. A length, from the feed point through an outer edge of the feed side element including the edge close to the ground and the short circuit element to the second end of the first open-ended element, is substantially a quarter of a wavelength of a first resonant frequency. A length, from the feed point through the outer edge of the feed side element including the edge close to the ground to the second end of the second open-ended element, is substantially a quarter of a wavelength of a second resonant frequency.

According to another embodiment of the invention, electronic equipment comprises a housing having a built-in antenna device. The antenna device comprises: a short circuit path a first end of which is connected to a ground point that is located near a feed point; a first open-ended element that has a second end being open, and extends from a second end of the short circuit path; a feed side element that extends from near the feed point in a direction in which the first open-ended element extends to have an edge close to ground; a second open-ended element that is connected to the feed side element, has a second end being open, and extends from a contact point connected to the feed side element in the direction in which the first open-ended element extends; the contact point being a second end of the feed side element; and a short circuit element that connects between a first end of the first open-ended element and either a point on an edge of the feed side element opposite the edge close to the ground or a point on the second open-ended element. A length, from the feed point through an outer edge of the feed side element including the edge close to the ground and the short circuit element to the second end of the first open-ended element, is substantially a quarter of a wavelength of a first resonant frequency. A length, from the feed point through the outer edge of the feed side element including the edge close to the ground to the second end of the second open-ended element, is substantially a quarter of a wavelength of a second resonant frequency.

With reference to FIG. 1, the configuration of a notebook PC according to a first embodiment of the invention will be schematically described. In the following embodiments, electronic equipment is described as a notebook PC with a built-in antenna device, and an antenna device is described as being applied to such a notebook PC. However, this is by way of example only. The electronic equipment may be of other types such as, for example, a personal digital assistant and a mobile phone with a built-in antenna device, and also the antenna device may be applied to them. FIG. 1 is a perspective view of a notebook PC 100 according to the first embodiment.

As illustrated in FIG. 1, the notebook PC 100 comprises a display module 101 and a main body 102. The display module 101 is a liquid crystal display (LCD) comprising a LCD panel 103. The display module 101 comprises, above the LCD panel 103, an antenna device 104 for wireless communication. The display module 101 and the main body 102 are configured to rotate freely on a hinge 105 between an open position and a closed position.

The main body 102 comprises a wireless communication module 106 as a feed circuit that generates a high-frequency signal corresponding to a transmission signal to transmit/receive a radio wave. The wireless communication module 106 is connected to the antenna device 104 via a feed line 107. The feed line 107 is a coaxial cable with a diameter of about 1 mm.

Figure 2:
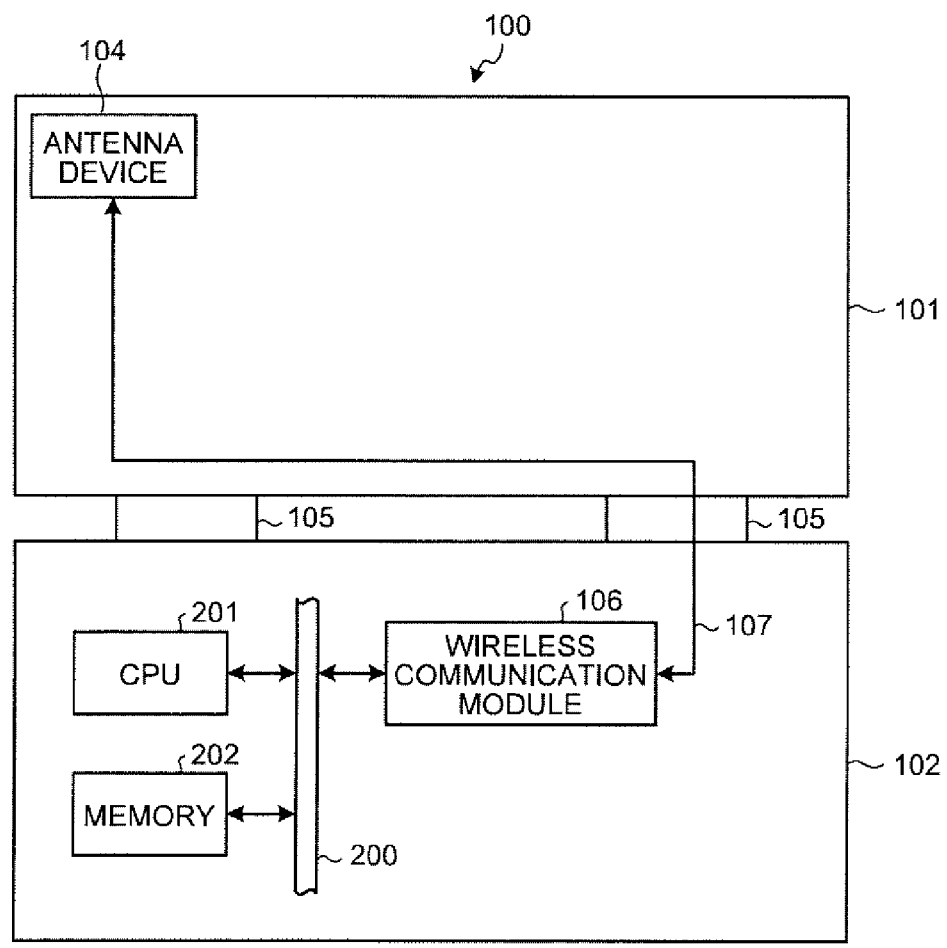
FIG. 2 is an exemplary schematic diagram of the circuitry of the notebook PC in the first embodiment.

With reference to FIG. 2, a description will be given of the circuitry of the notebook PC 100 according to the first embodiment. FIG. 2 is a schematic diagram of the circuitry of the notebook PC 100. The wireless communication module 106 is connected via a CPU bus 200 to a CPU 201 and a memory 202. Although not illustrated, the wireless communication module 106 comprises a radio frequency (RF) module, a crystal oscillator, and a baseband module.

Figure 3:
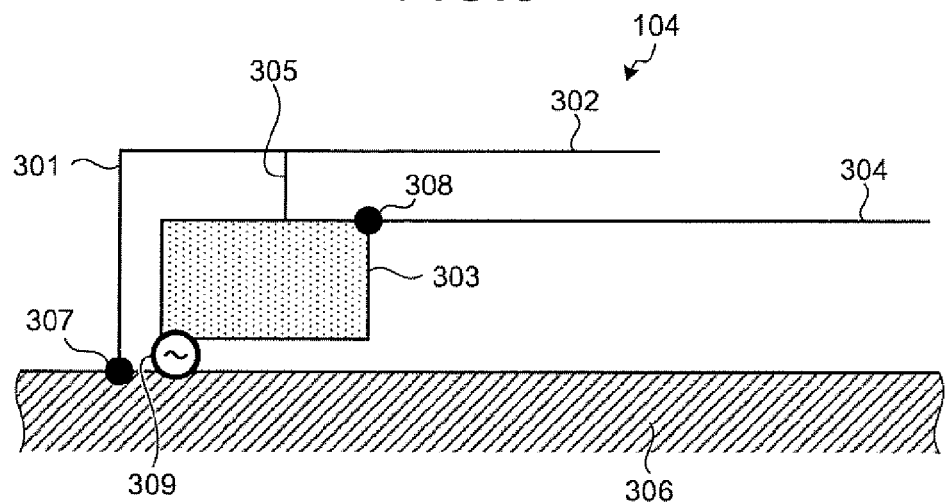
FIG. 3 is an exemplary schematic diagram of an antenna device in the first embodiment.

With reference to FIG. 3, a description will be given of a specific configuration of the antenna device 104. FIG. 3 is a schematic diagram of the antenna device 104. The antenna device 104 comprises a short circuit path 301, a first open-ended element 302, a feed side element 303, a second open-ended element 304, a short circuit element 305, and a ground conductor (GND) 306.

According to the first embodiment, a ground point 307, i.e., a point on the GND 306, is arranged near a feed point 309.

A first end of the short circuit path 301 is connected to the ground point 307. According to the first embodiment, the short circuit path 301 extends from the ground point 307 vertically with respect to the GND 306, and then bends and extends parallel to the GND 306.

The first open-ended element 302 is a linear element having an open end, and extends from a second end of the short circuit path 301.

The feed side element 303 is a plate-like element. The feed side element 303 is located between the first open-ended element 302 and the GND 306, and extends from the feed point 309 in the direction in which the first open-ended element 302 extends. According to the first embodiment, a corner of the feed side element 303 is connected to the feed point 309.

The second open-ended element 304 is a linear element having an open end, and extends from a second end of the feed side element 303 in the direction in which the first open-ended element 302 extends. According to the first embodiment, the second open-ended element 304 is connected to a corner of the feed side element 303 diagonally opposite the corner connected to the feed point 309.

The short circuit element 305 is a linear element, and connects between a point on an edge of the feed side element 303 close to a contact point 308, i.e., the second end of the feed side element 303, and a first end of the first open-ended element 302. The short circuit element 305 need not necessarily be located as illustrated in FIG. 3, and may be located at different positions. Note that as the point on an edge of the feed side element 303 connected to the short circuit element 305 is closer to the contact point 308, better antenna characteristics are achieved.

With reference to FIGS. 4 to 7, a description will be given of the operation principle of the antenna device 104.

Figure 4:
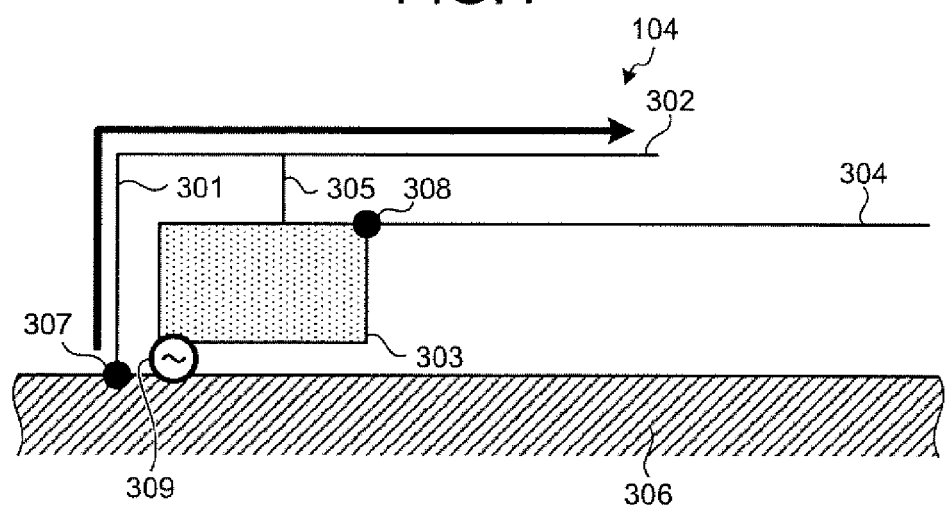
FIG. 4 is an exemplary schematic diagram for explaining the operation principle of a short circuit path and a first open-ended element in the first embodiment.

FIG. 4 is a schematic diagram for explaining the operation principle of the short circuit path 301 and the first open-ended element 302. The short circuit path 301 and the first open-ended element 302 causes parallel resonance at a wavelength such that their entire length, from the ground point 307 through the short circuit path 301 to a second end of the first open-ended element 302 indicated by an arrow, is substantially a quarter the wavelength (this parallel resonance is hereinafter referred to as "first parallel resonance").

Figure 5:
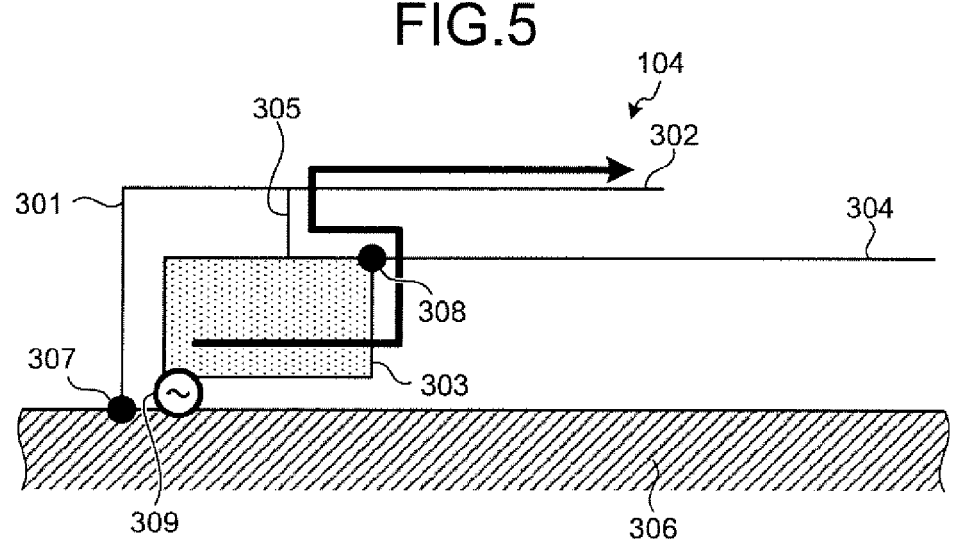
FIG. 5 is an exemplary schematic diagram for explaining the operation principle of a feed side element, a short circuit element, and the first open-ended element in the first embodiment.

FIG. 5 is a schematic diagram for explaining the operation principle of the feed side element 303, the short circuit element 305, and the first open-ended element 302. The feed side element 303, the short circuit element 305, and the first open-ended element 302 causes series resonance at a first resonant frequency band. More specifically, the feed side element 303, the short circuit element 305, and the first open-ended element 302 resonate at a wavelength such that the length, from the feed point 309 through the outer edge (on the GND 306 side) of the feed side element 303 and the short circuit element 305 to the second end of the first open-ended element 302 indicated by an arrow, is substantially a quarter the wavelength (hereinafter this series resonance is referred to as "first series resonance", and the first resonant frequency indicates the frequency of the first series resonance).

Figure 6:
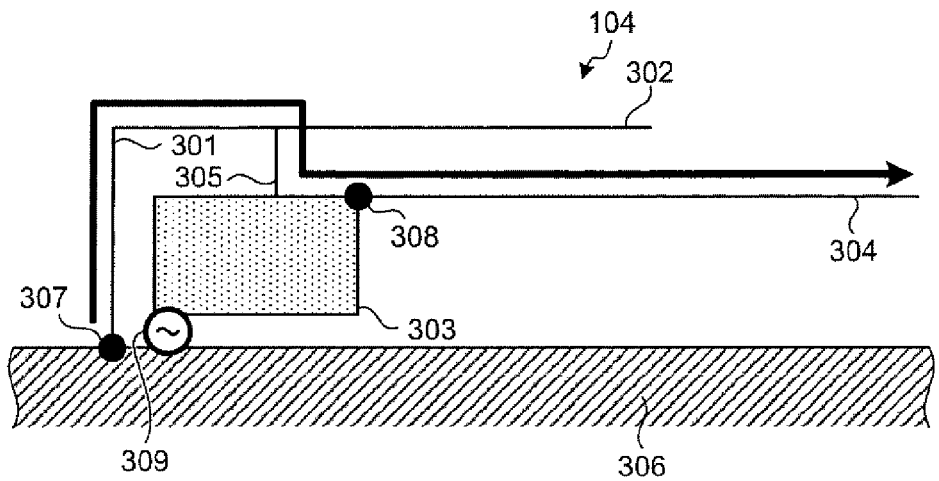
FIG. 6 is an exemplary schematic diagram for explaining the operation principle of the short circuit path, the short circuit element, and a second open-ended element in the first embodiment.

FIG. 6 is a schematic diagram for explaining the operation principle of the short circuit path 301, the short circuit element 305, and the second open-ended element 304. The short circuit path 301, the short circuit element 305, and the second open-ended element 304 causes parallel resonance at a wavelength such that their entire length, from the ground point 307 through the short circuit path 301 and the short circuit element 305 to the second end of the second open-ended element 304 indicated by an arrow, is substantially a quarter the wavelength (this parallel resonance is hereinafter referred to as "second parallel resonance").

Figure 7:
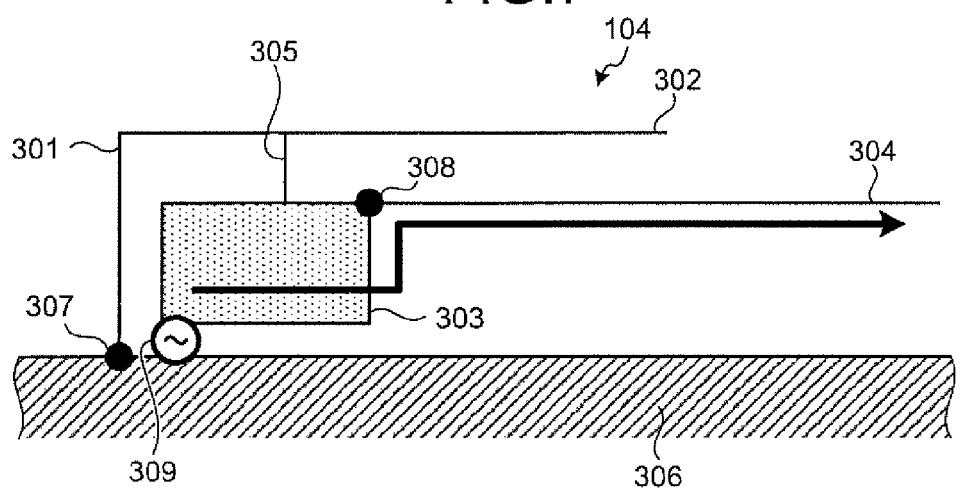
FIG. 7 is an exemplary schematic diagram for explaining the operation principle of the feed side element and the second open-ended element in the first embodiment.

FIG. 7 is a schematic diagram for explaining the operation principle of the feed side element 303 and the second open-ended element 304. The feed side element 303 and the second open-ended element 304 causes series resonance at a wavelength such that the length, from the feed point 309 through the outer edge (on the GND 306 side) of the feed side element 303 to the second end of the second open-ended element 304 indicated by an arrow, is substantially a quarter the wavelength (hereinafter this series resonance is referred to as "second series resonance", and the frequency of the second series resonance is referred to as "second resonant frequency").

As described above, according to the first embodiment, the first parallel resonance and the first series resonance occur in a first resonant frequency band, and also the second parallel resonance and the second series resonance occur in a second resonant frequency band. Thus, the antenna device 104 can create a current distribution similar to that obtained by the resonance of a folded monopole antenna, and therefore can exhibit two resonances with high input impedance. Accordingly, even when the antenna device 104 is shortened, favorable input impedance can be obtained.

Described below is an analytical model of the antenna device 104 and the analysis results of the antenna characteristics thereof.

Figure 8:
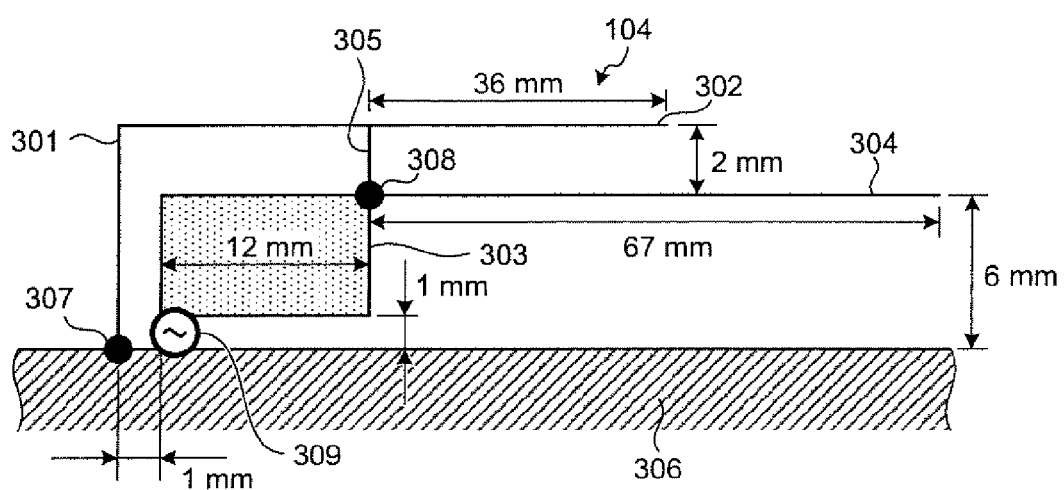
FIG. 8 is an exemplary diagram of a specific form of an analytical model in the first embodiment.
Figure 9:
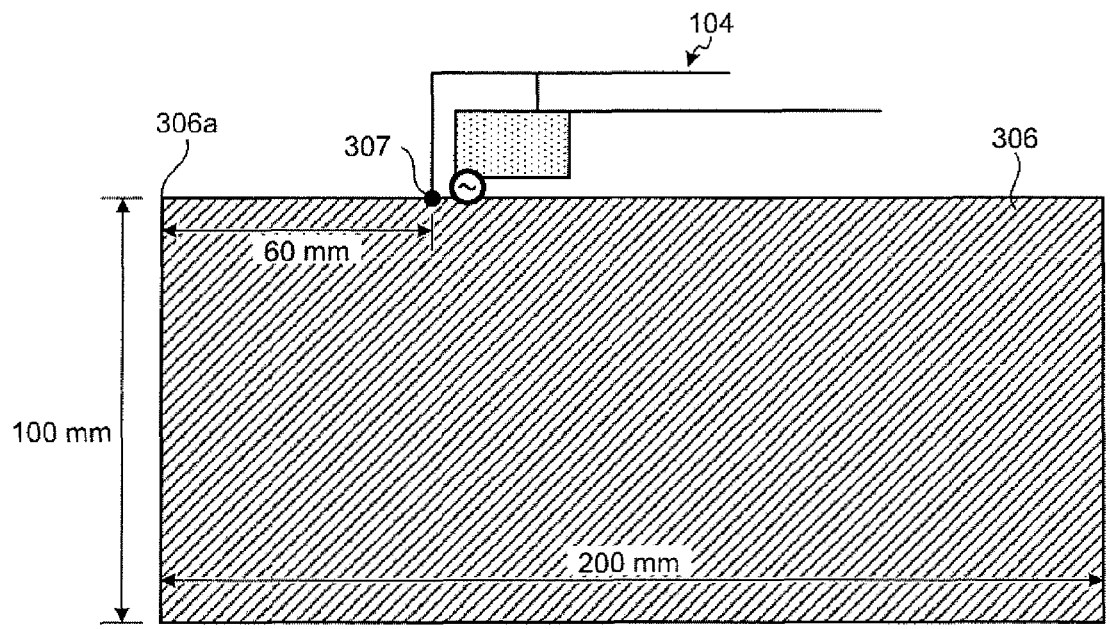
FIG. 9 is an exemplary diagram of a form of a ground conductor of the analytical model in the first embodiment.

With reference to FIGS. 8 and 9, a description will be given of a specific form of an analytical model to which is applied the antenna device 104 according to the first embodiment. FIG. 8 is a diagram illustrating a specific form of the analytical model. The analytical model of FIG. 8 is designed such that the first resonant frequency band is about 1.8 GHz and the second resonant frequency band is about 900 MHz. FIG. 9 is a diagram illustrating the form of the GND 306 of the analytical model. All the following analysis results are the results of the Method of Moment.

The short circuit path 301 extends from the ground point 307 vertically with respect to the GND 306, and then bends and extends parallel to the GND 306. The first open-ended element 302 extends from the second end of the short circuit path 301. The feed side element 303 is a plate-like element, and a corner of which is connected to the feed point 309. The second open-ended element 304 is connected to a corner of the feed side element 303 diagonally opposite the corner connected to the feed point 309. The second open-ended element 304 has an open end, and extends in the direction in which the first open-ended element 302 extends. The short circuit element 305 connects between a point close to the contact point 308 and the first end of the first open-ended element 302. The short circuit element 305 extends vertically with respect to the GND 306.

It is assumed in this analytical model that the GND 306 has a length of 100 mm in the direction in which the short circuit path 301 extends, and a length of 200 mm in the direction perpendicular to the direction in which the short circuit path 301 extends.

Figure 10:
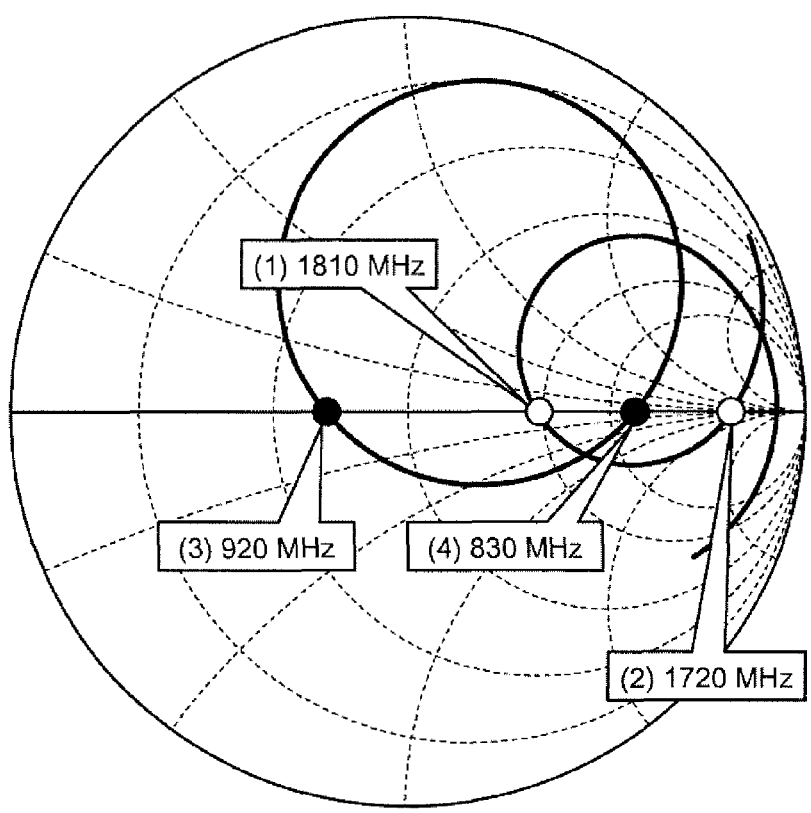
FIG. 10 is an exemplary Smith chart of the antenna characteristics of the analytical model of FIGS. 8 and 9 in the first embodiment.
Figure 11:
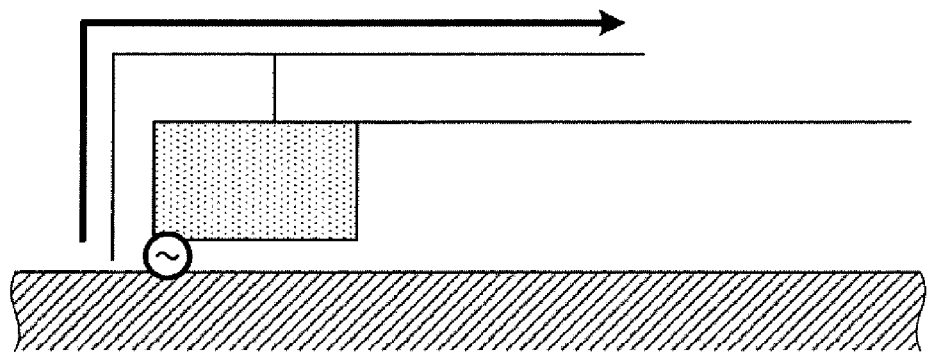
FIGS. 11 to 14 are exemplary schematic diagrams for explaining an antenna realized by the analytical model of FIGS. 8 and 9 in the first embodiment.
Figure 12:
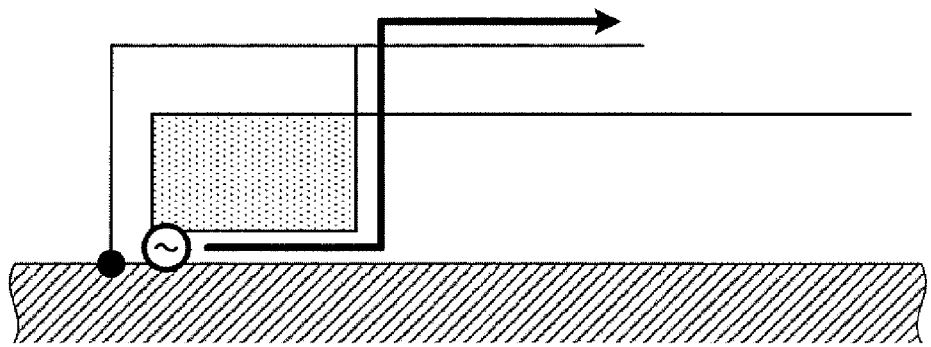

With reference to FIGS. 10 to 14, a description will be given of the antenna characteristics of the analytical model of FIGS. 8 and 9. FIG. 10 is a Smith chart of the antenna characteristics of the analytical model of FIGS. 8 and 9. FIGS. 11 to 14 are schematic diagrams for explaining an antenna realized by the analytical model of FIGS. 8 and 9. The Smith chart of FIG. 10 represents the impedance variation of the analytical model when the frequency signal fed from the feed point 309 is changed in a range of 700 to 2500 MHz.

As illustrated in FIG. 10, the plot of the impedance of the analytical model crosses the horizontal axis of the Smith chart at (2) 1720 MHz. This represents the occurrence of the first parallel resonance indicated by an arrow in FIG. 11. Similarly, the plot of the impedance of the analytical model crosses the horizontal axis of the Smith chart at (1) 1810 MHz. This represents the occurrence of the first series resonance indicated by an arrow in FIG. 12.

As just described, with this analytical model, the first parallel resonance and the first series resonance occur at nearby frequencies. Thus, the input impedance at the first resonant frequency can be increased.

In addition, the plot of the impedance of the analytical model crosses the horizontal axis of the Smith chart at (4) 830 MHz. This represents the occurrence of the second parallel resonance indicated by an arrow in FIG. 13. Similarly, the plot of the impedance of the analytical model crosses the horizontal axis of the Smith chart at (3) 920 MHz. This represents the occurrence of the second series resonance indicated by an arrow in FIG. 14.

As just described, with this analytical model, the second parallel resonance and the second series resonance occur at nearby frequencies. Thus, the input impedance at the second resonant frequency can be increased. Moreover, in the band of the second resonant frequency (the second resonant frequency band), the plot on the Smith chart passes the center of the chart, i.e., around 50Ω. Therefore, the second resonant frequency band can be widened.

Figure 15:
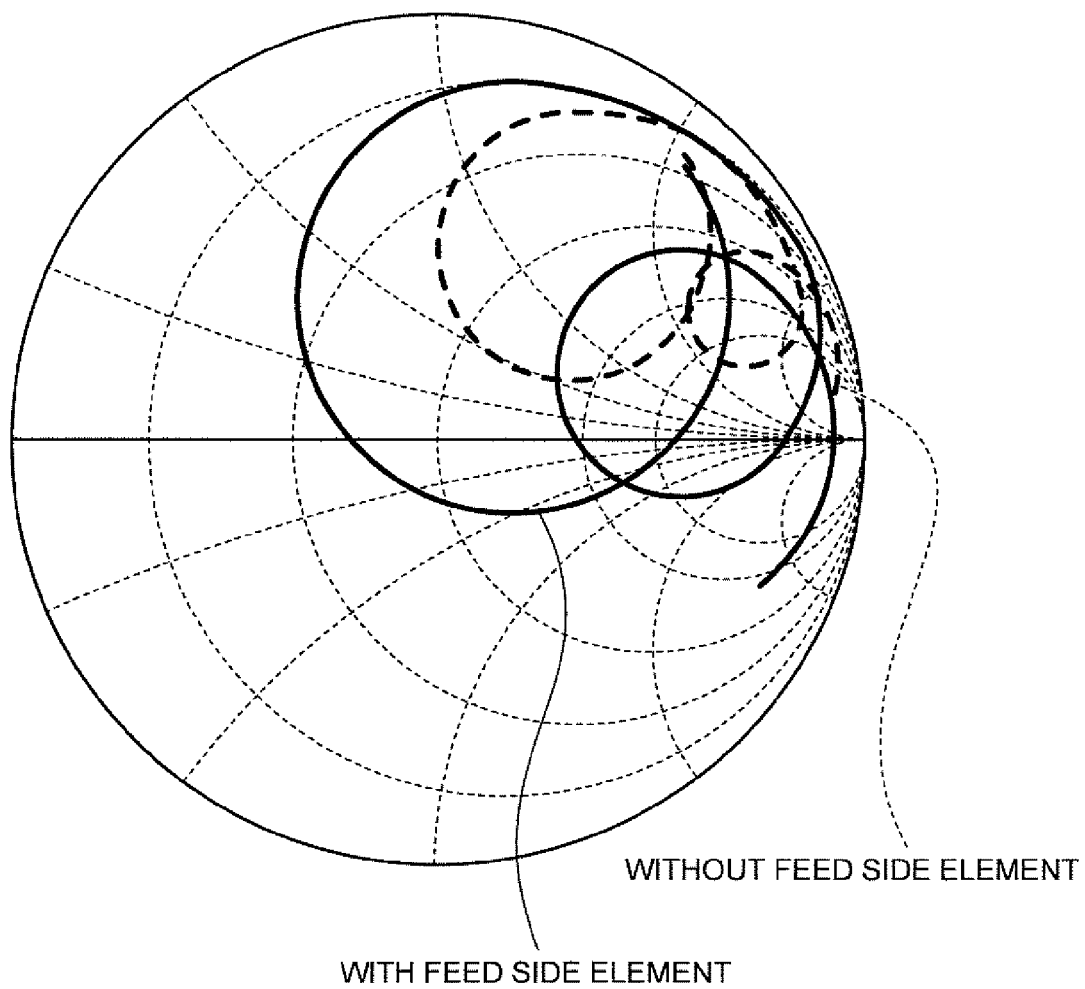
FIG. 15 is an exemplary Smith chart of the antenna characteristics of the analytical model having the feed side element and one not having the feed side element in the first embodiment.
Figure 16:
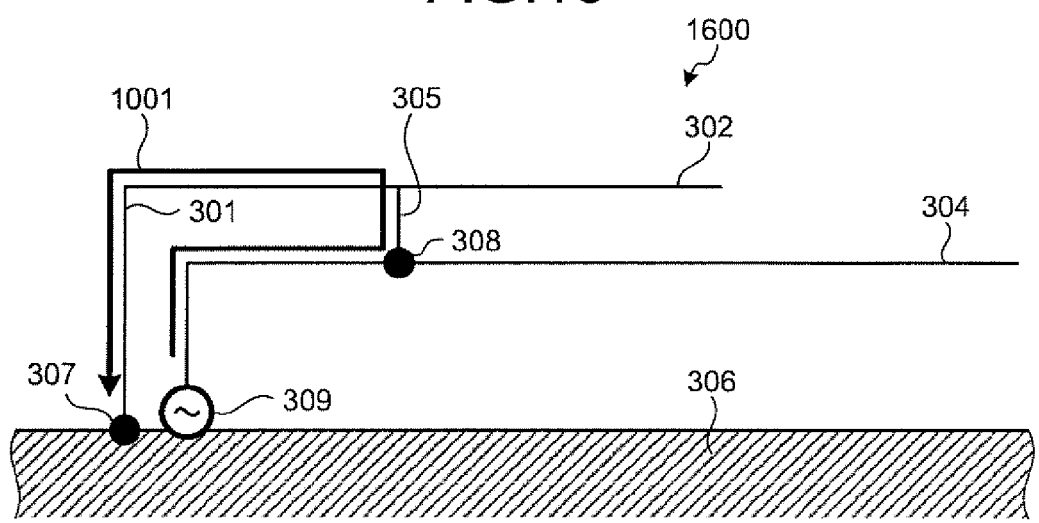
FIG. 16 is an exemplary schematic diagram for explaining current flow in the analytical model having the feed side element in the first embodiment.
Figure 17:
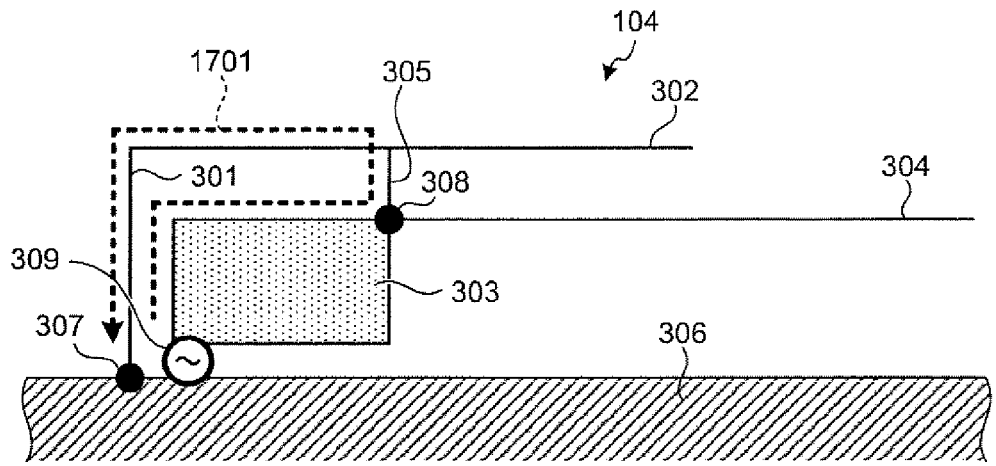
FIG. 17 is an exemplary schematic diagram for explaining current flow in the analytical model not having the feed side element in the first embodiment.

With reference to FIGS. 15 to 17, a description will be given of the results of comparison between the analytical model having the feed side element 303 and that of a conventional antenna device 1600 not having the feed side element 303. The conventional antenna device 1600 is of basically the same form as the antenna device 104 except for the absence of the feed side element 303, and will not be described in detail. FIG. 15 is a Smith chart of the input impedance of the analytical model having the feed side element 303 and one not having the feed side element 303 at frequencies of 700 to 2500 MHz.

As illustrated in FIG. 15, with respect to the analytical model of the conventional antenna device 1600 that is not provided with the feed side element 303 as illustrated in FIG. 16, the plot on the Smith chart deviates upward from the centre of the chart, i.e., around 50Ω. This is because the inductivity of the input impedance increases due to current 1001 flowing from the feed point 309 through the short circuit element 305 and the short circuit path 301 to the ground point 307 as illustrated in FIG. 16.

On the other hand, as illustrated in FIG. 15, with respect to the analytical model of the antenna device 104 that is provided with the feed side element 303, the plot is drawn in the centre of the Smith chart, i.e., around 50Ω, compared to the analytical model of the conventional antenna device 1600. This indicates that current 1701, which flows from the feed point 309 through the outer edge (on the side opposite the GND 306 side) of the feed side element 303, the short circuit element 305 and the short circuit path 301 to the ground point 307 as illustrated in FIG. 17, is smaller than the current 1001, and thus the inductivity of the input impedance is low. As a result, favorable impedance matching can be achieved.

As described above, according to the first embodiment, with the feed side element 303, the inductivity of the input impedance of the antenna device 104 can be lower compared to an antenna device not provided with the feed side element 303. Thus, favorable impedance matching can be achieved in the band of each resonant frequency.

If the antenna device as described in the first embodiment is supplied with power via a coaxial cable, the feed line, i.e., a coaxial cable, can be prevented from adversely affecting the characteristics of the antenna device by grounding the short circuit path connected to the outer conductor of the feed line. Such an antenna device will be described as an modification of the first embodiment. The antenna device of the modification is of basically the same configuration as previously described in the first embodiment, and thus only the difference from the first embodiment will be described.

Figure 18:
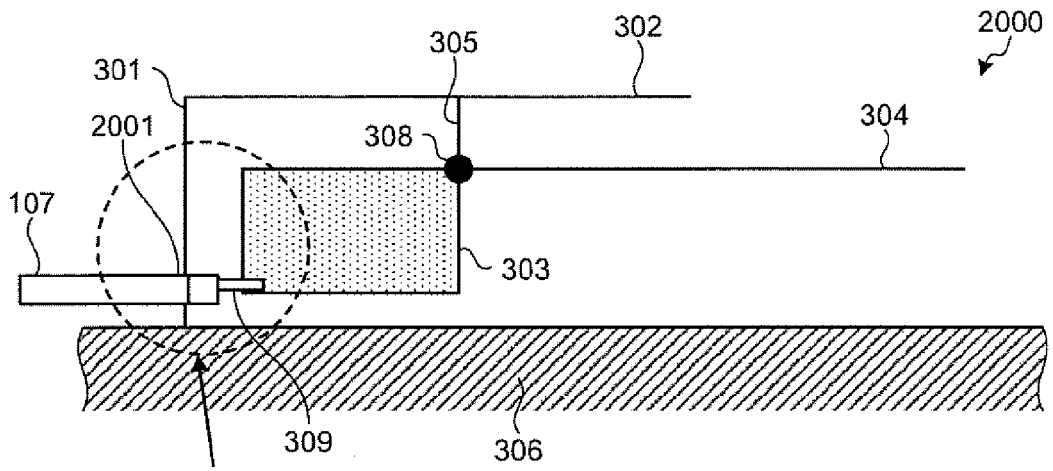
FIG. 18 is an exemplary schematic diagram of an antenna device according to a modification of the first embodiment.

FIG. 18 is a schematic diagram of an antenna device 2000 according to the modification. With reference to FIG. 18, a description will be given of how to attach the feed line to the antenna device 2000.

In the antenna device 2000 of the modification, the short circuit path 301 is connected to an outer conductor 2001 of the feed line 107 that is a coaxial cable for supplying power to the feed point 309. According to the modification, the short circuit path 301 is soldered to the outer conductor 2001. As just described, since the feed line 107 is connected to the feed point 309 inside the antenna device 2000, extra space is not required for soldering and grounding of the outer conductor 2001. Therefore, the antenna device 2000 needs less space for installation. Moreover, the short circuit path 301 is connected to the outer conductor 2001 of the feed line 107 and led out in a direction separate from the antenna device 2000. This prevents the feed line 107 from being located close to the antenna device 2000. Thus, the feed line 107 can be prevented from adversely affecting the characteristics of the antenna device 2000.

Described below is an antenna device according to a second embodiment of the invention. In the second embodiment, the feed point is spaced apart from the ground point by an appropriate distance. The antenna device of the second embodiment is of basically the same configuration as previously described in the first embodiment, and thus only the difference from the first embodiment will be described.

The feed point 309 is spaced apart from the ground point 307 in the direction in which the first open-ended element 302 extends. The distance between the feed point 309 and the ground point 307 is equal to or less than substantially a twentieth of the wavelength of the lower one of the first resonant frequency or the second resonant frequency. For example, if the second resonant frequency is 910 MHz which is lower than the first resonant frequency, the feed point 309 is spaced apart from the ground point 307 by a distance equal to or less than 16 mm, substantially a twentieth of wavelength $\lambda$=330 mm.

In the following, a description will be given of analytical models of the antenna device 104 according to the second embodiment and results of analysis on the antenna characteristics.

Figure 19:
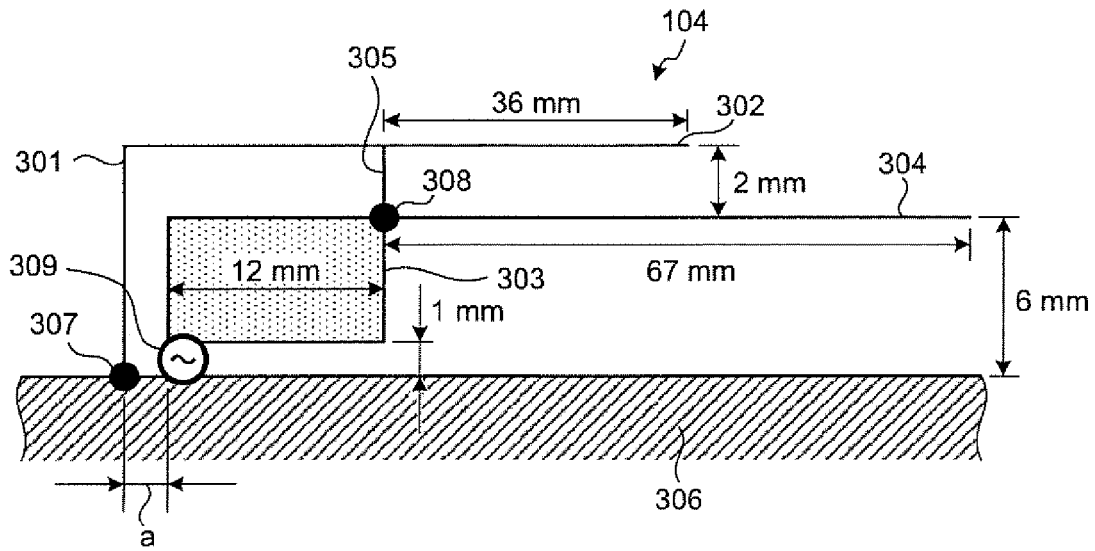
FIG. 19 is an exemplary schematic diagram of an analytical model of an antenna device comprising a short circuit path in a second embodiment of the invention.
Figure 20:
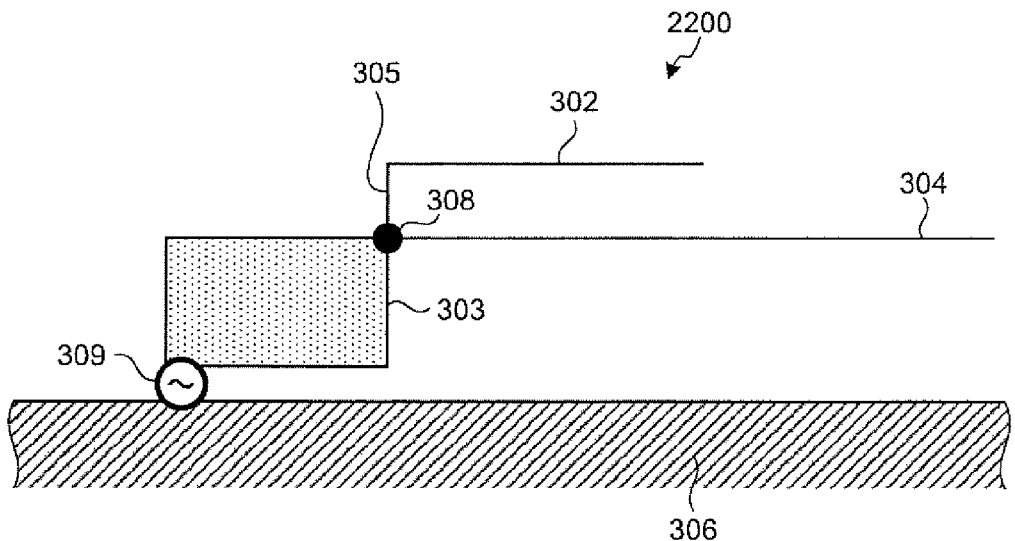
FIG. 20 is an exemplary schematic diagram of an analytical model of an antenna device having no short circuit path in the second embodiment.

With reference to FIGS. 19 and 20, a description will first be given of three analytical models the antenna characteristics of which are analyzed. FIG. 19 is a schematic diagram of an analytical model of the antenna device 104 comprising the short circuit path. The analytical model of FIG. 19 is designed such that the first resonant frequency band is about 1.8 GHz and the second resonant frequency band is about 900 MHz. FIG. 20 is a schematic diagram of an analytical model of an antenna device 2200 having no short circuit path. The analytical models are basically similar to that of the antenna device according to the first embodiment except for the distance between the feed point 309 and the ground point 307. Therefore, their description will not be repeated.

In the first analytical model illustrated in FIG. 19, the feed point 309 is spaced apart from the ground point 307 by a distance a=1 mm on the GND 306. The second analytical model of the antenna device 2200 is not provided with the short circuit path 301 as can be seen from FIG. 20. In the third analytical model illustrated in FIG. 19, the feed point 309 is spaced apart from the ground point 307 by a distance a=16 mm on the GND 306.

Figure 21:
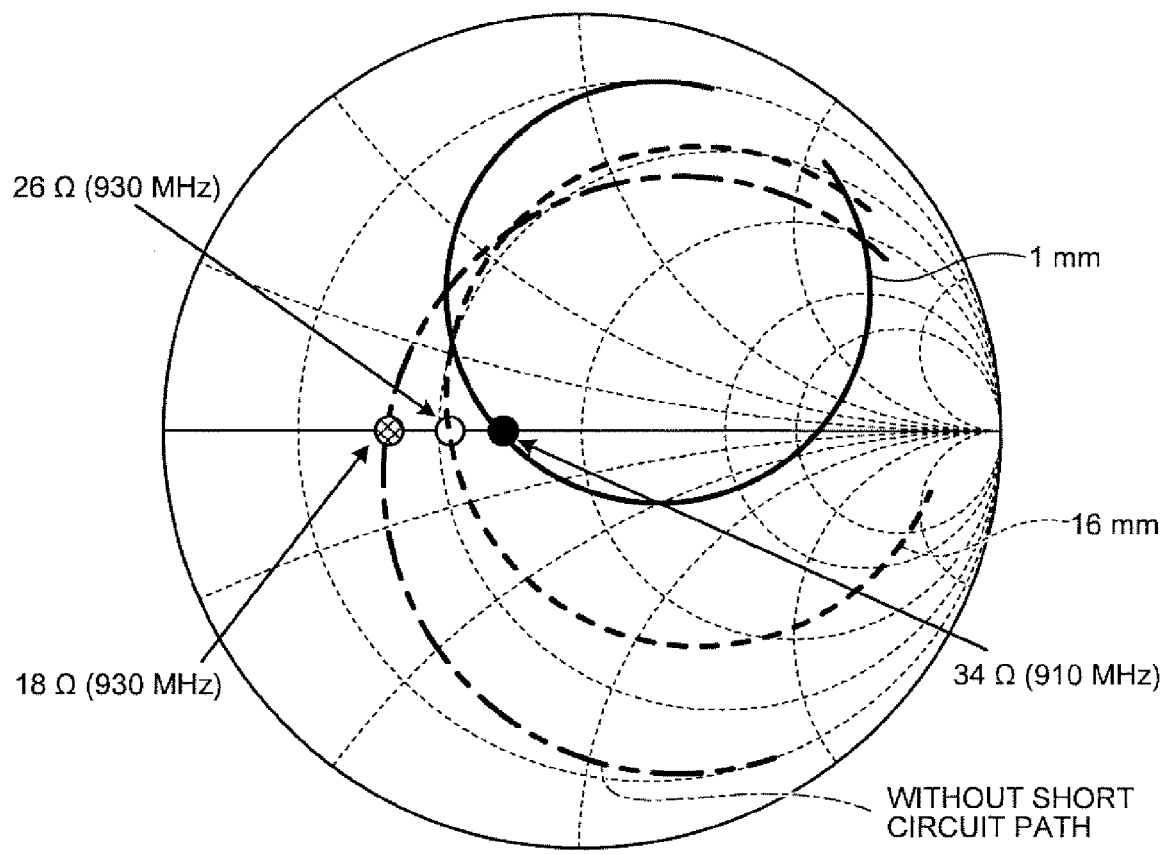
FIG. 21 is an exemplary Smith chart of the antenna characteristics of the analytical models of FIGS. 19 and 20 in the second embodiment.

With reference to FIG. 21, a description will then be given of the antenna characteristics of the above analytical models. The Smith chart of FIG. 21 represents the impedance variation of the analytical models of FIGS. 19 and 20 when the frequency signal fed from the feed point 309 is changed in a range of 700 to 1200 MHz.

The plot of the impedance of the first analytical model (a=1 mm) crosses the horizontal axis of the Smith chart at 910 MHz. At the cross point, the impedance is about 34Ω, which is close to 50Ω at the center of the Smith chart. This is because, in the first analytical model (a=1 mm), the second parallel resonance illustrated in FIG. 13 and the second series resonance illustrated in FIG. 14 occur at nearby frequencies.

The plot of the impedance of the second analytical model crosses the horizontal axis of the Smith chart at 930 MHz. At the cross point, the impedance is about 18Ω, which is far from 50Ω at the center of the Smith chart compared to the first analytical model (a=1 mm). This is because, in the second analytical model (FIG. 20), the second parallel resonance illustrated in FIG. 13 does not occur, and the current distribution is similar to a monopole antenna.

Figure 13:
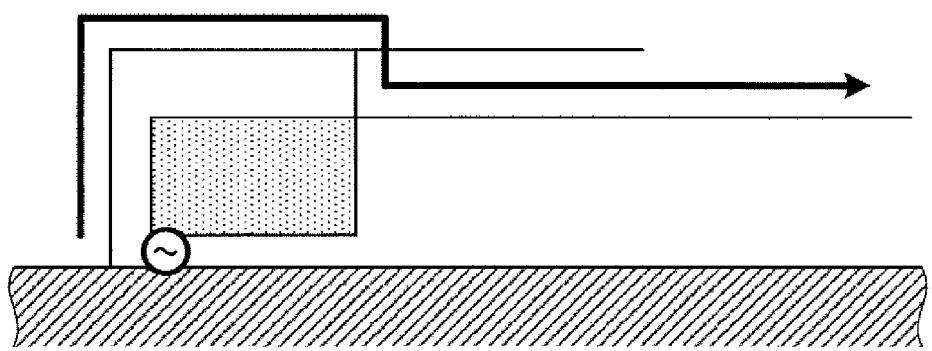
Figure 14:
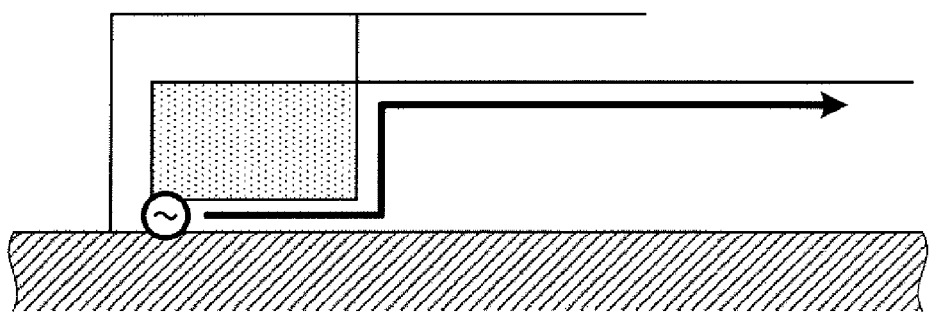

The plot of the impedance of the third analytical model (a=16 mm) crosses the horizontal axis of the Smith chart at 930 MHz. At the cross point, the impedance is about 26Ω, which is far from 50Ω at the center of the Smith chart compared to the impedance of the second resonant frequency of the first analytical model. This is because, in the third analytical model (a=16 mm), the path to determine the frequency of the second parallel resonance illustrated in FIG. 13 is long compared to the first analytical model (a=1 mm). As a result, the second parallel resonance occurs at a frequency far from that of the second series resonance illustrated in FIG. 14.

According to the analysis results described above, the impedance (26Ω) of the third analytical model (a=16 mm) at the cross point on the horizontal axis of the Smith chart is substantially intermediate between the impedance (34Ω) of the first analytical model (a=1 mm) and the impedance (18Ω) of the second analytical model (without the short circuit path 301). Therefore, according to the second embodiment, the third analytical model is used as a reference. Since a=16 mm is a value substantially a twentieth of wavelength $\lambda$=330 mm of the second resonant frequency (910 MHz), the feed point 309 is spaced apart from the ground point 307 by a distance equal to or less than substantially a twentieth of wavelength $\lambda$ of the second resonant frequency.

Described below is an antenna device according to a third embodiment of the invention. In the third embodiment, the length of the feed side element is adjusted to be appropriate in the direction in which the first open-ended element 302 extends to thereby lower the inductivity of the input impedance. The antenna device of the third embodiment is of basically the same configuration as the antenna device of the second embodiment, and thus only the difference between the two will be described.

Figure 22:
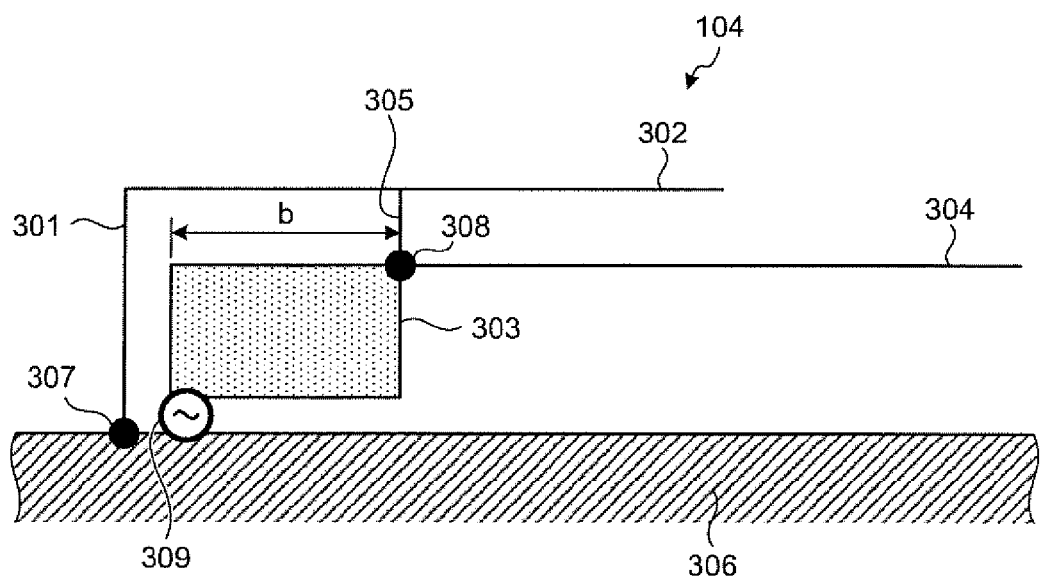
FIG. 22 is an exemplary schematic diagram of an antenna device according to a third embodiment of the invention.

FIG. 22 is a schematic diagram of the antenna device according to the third embodiment. It is assumed that the feed side element 303 has a length b in the direction in which the first open-ended element 302 extends that is equal to or more than substantially a fiftieth of the wavelength of the second resonant frequency. If, for example, the second resonant frequency is 865 MHz, the length b, i.e., the length from the feed point 309 in the direction in which the first open-ended element 302 extends (parallel to the GND 306), of the feed side element 303 is 7 mm, substantially a fiftieth of wavelength $\lambda$=346 mm of the second resonant frequency.

In the following, a description will be given of analytical models of the antenna device 104 having different lengths b and results of analysis on the antenna characteristics.

Figure 23:
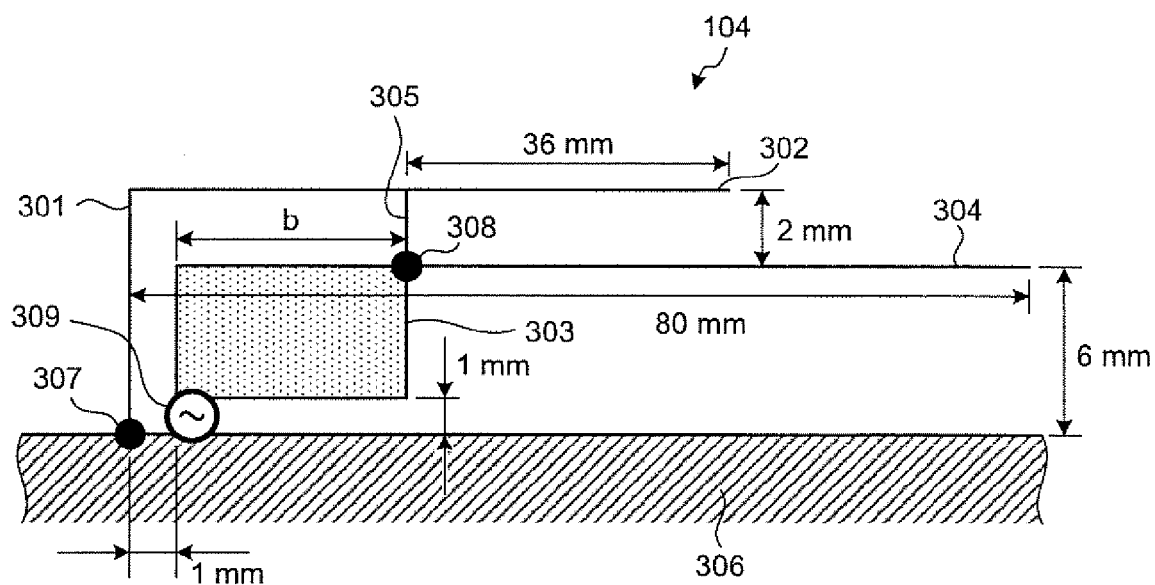
FIG. 23 is an exemplary diagram of a specific form of an analytical model in the third embodiment.

With reference to FIG. 23, a description will first be given of three analytical models the antenna characteristics of which are analyzed. FIG. 23 is a diagram illustrating a specific form of the analytical models. The analytical models of FIG. 23 are designed such that the first resonant frequency band is about 1.8 GHz and the second resonant frequency band is about 900 MHz. The analytical models are basically similar to that of the antenna device according to the second embodiment except for the form of the feed side element 303. Therefore, their description will not be repeated.

In the first analytical model, the length b of the feed side element 303 is 5 mm. In the second analytical model, the length b of the feed side element 303 is 6 mm. In the third analytical model, the length b of the feed side element 303 is 7 mm.

Figure 24:
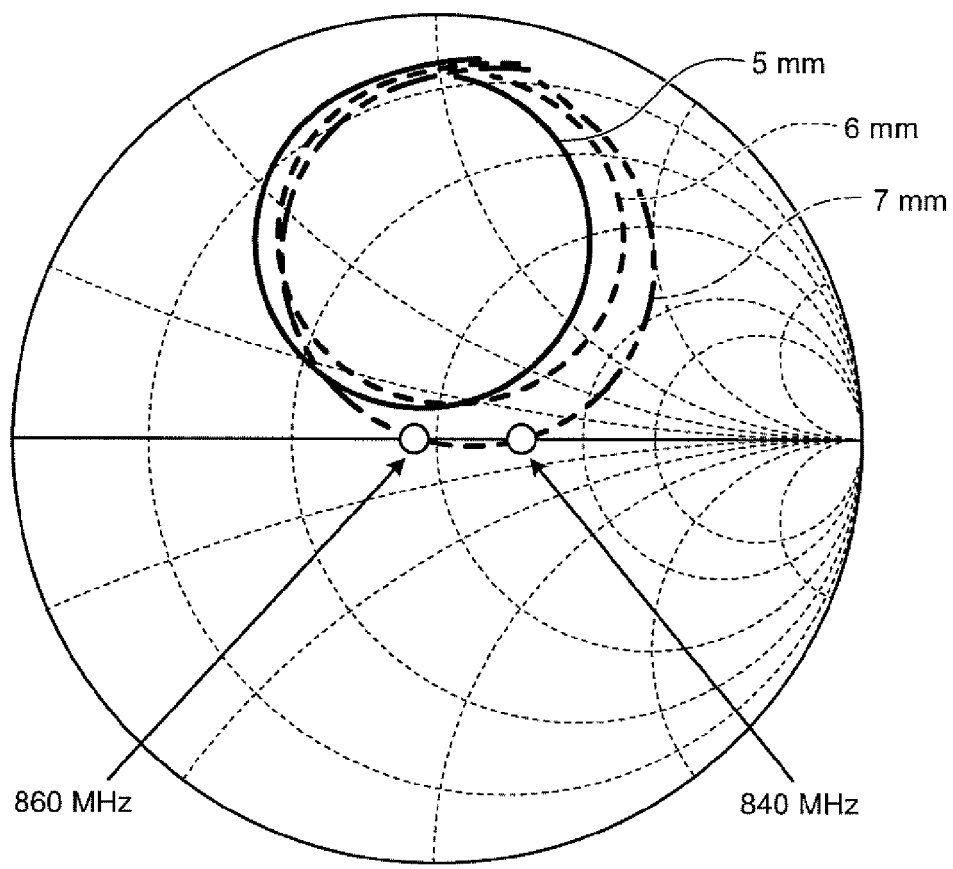
FIG. 24 is an exemplary Smith chart of the antenna characteristics of the analytical model of FIG. 23 in the third embodiment.

With reference to FIG. 24, a description will then be given of the antenna characteristics of the above analytical models. The Smith chart of FIG. 24 represents the impedance variation of the analytical models of FIG. 23 when the frequency signal fed from the feed point 309 is changed in a range of 700 to 1200 MHz.

The plots of the impedance of the first analytical model (b=5 mm) and the second analytical model (b=6 mm) deviate upward and do not cross the horizontal axis of the Smith chart. This is because the feed side element 303 does not have a sufficient length in the direction in which the first open-ended element 302 extends. Therefore, as with a conventional antenna device formed of linear elements, the effect of the current flowing from the feed point 309 to the ground point 307 is not sufficiently suppressed, which results in high inductivity of the input impedance. On the other hand, the plot of the impedance of the third analytical model (b=7 mm) crosses the horizontal axis of the Smith chart at 840 MHz and 860 MHz. This represents the occurrence of the second parallel resonance illustrated in FIG. 13 and the second series resonance illustrated in FIG. 14

It can be seen from the analysis results described above that the inductivity of the input impedance decreases as the length b of the feed side element 303 increases. Therefore, according to the third embodiment, the third analytical model is used as a reference. Since b=7 mm is a value substantially a fiftieth of wavelength λ=365 mm of the second resonant frequency (865 MHz), the length b, i.e., the length from the feed point 309 in the direction in which the first open-ended element 302 extends (parallel to the GND 306), of the feed side element 303 is adjusted to be equal to or more than substantially a fiftieth of the wavelength of the second resonant frequency.

Described below is an antenna device according to a fourth embodiment of the invention. In the fourth embodiment, the contact point, i.e., the second end of the feed side element, and the first end of the first open-ended element are connected via the short circuit element to prevent the input impedance from excessively rising and thereby to widen the band of the first resonant frequency (the first resonant frequency band). The antenna device of the fourth embodiment is of basically the same configuration as the antenna device of the third embodiment, and thus only the difference between the two will be described.

Figure 25:
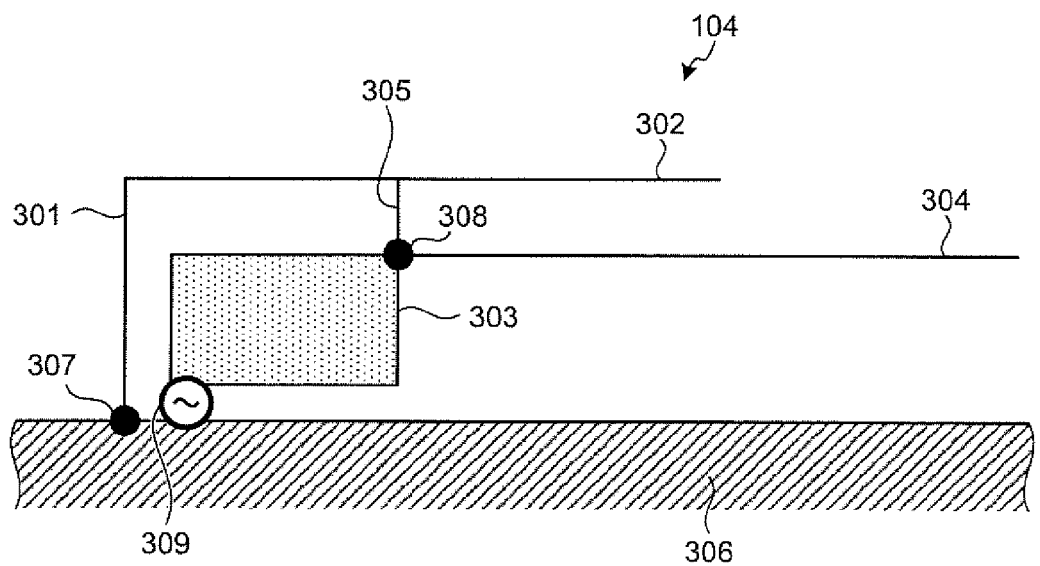
FIG. 25 is an exemplary schematic diagram of an antenna device according to a fourth embodiment of the invention.

FIG. 25 is a schematic diagram of the antenna device according to the fourth embodiment. The short circuit element 305 connects between the contact point 308, i.e., the second end of the feed side element 303 and the first end of the first open-ended element 302.

In the following, a description will be given of analytical models of the antenna device 104 in which the short circuit element 305 is connected to different positions, and results of analysis on the antenna characteristics.

Figure 26:
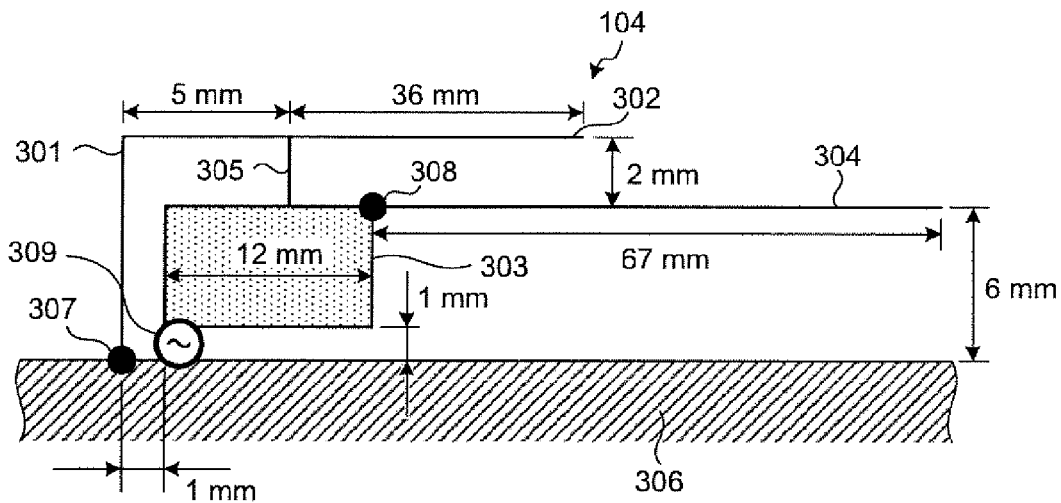
FIGS. 26 to 28 are exemplary diagrams of specific forms of analytical models in the fourth embodiment.
Figure 27:
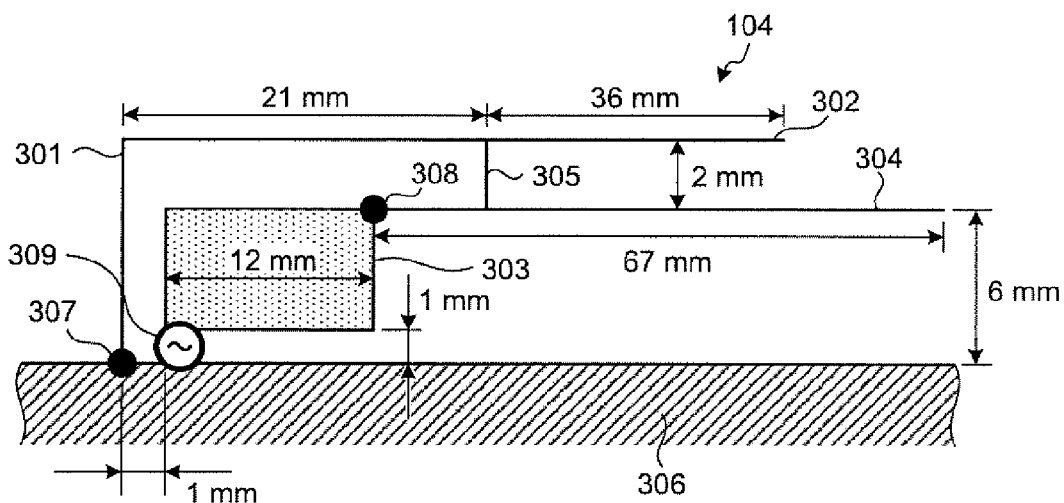
Figure 28:
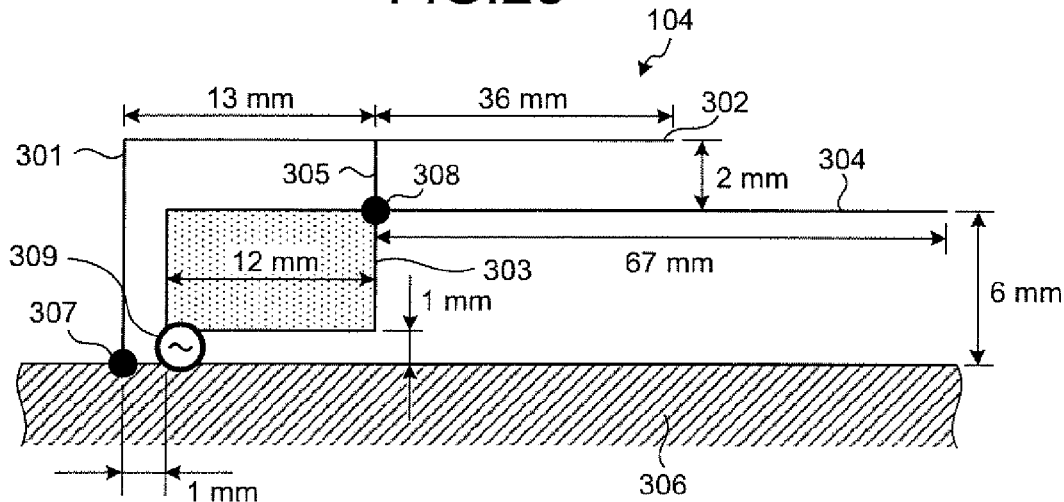

With reference to FIGS. 26 to 28, a description will first be given of three analytical models the antenna characteristics of which are analyzed. FIGS. 26 to 28 are diagrams of specific forms of the analytical models. The analytical models of FIGS. 26 to 28 are designed such that the first resonant frequency band is about 1.8 GHz and the second resonant frequency band is about 900 MHz. The analytical models are basically similar to that of the antenna device according to the third embodiment except for the position to which the short circuit element 305 is connected (connection position). Therefore, their description will not be repeated.

In the analytical model of FIG. 26, the length of the short circuit path 301 is reduced in the direction in which the first open-ended element 302 extends to shift the connection position of the short circuit element 305 from the contact point 308 side to the short circuit path 301 side. In the analytical model of FIG. 27, the length of the short circuit path 301 is increased in the direction in which the first open-ended element 302 extends to shift the connection position of the short circuit element 305 from the contact point 308 side to the first open-ended element 302 side. In the analytical model of FIG. 28, the short circuit element 305 is connected to the contact point 308.

Figure 29:
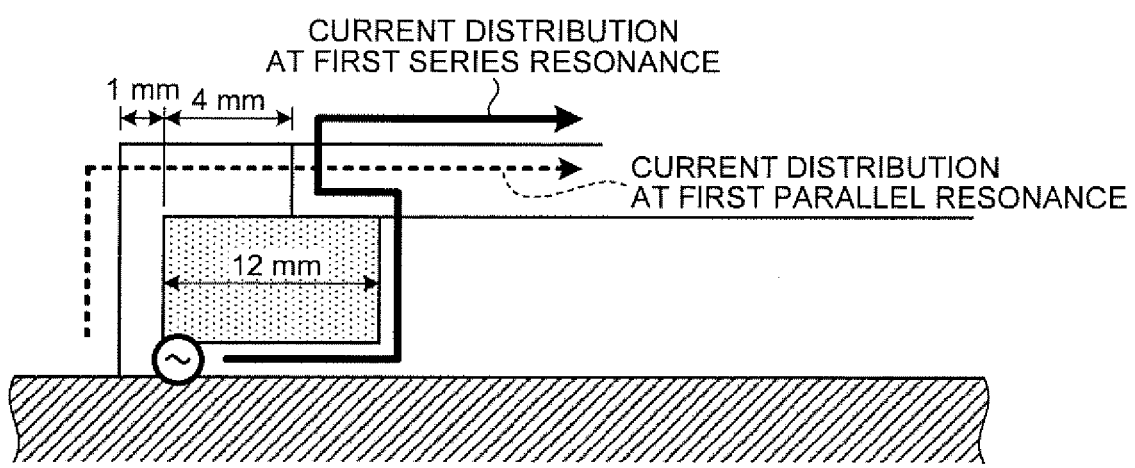
FIG. 29 is an exemplary schematic diagram for explaining resonance that occurs in the analytical model of FIG. 26 in the fourth embodiment.
Figure 30:
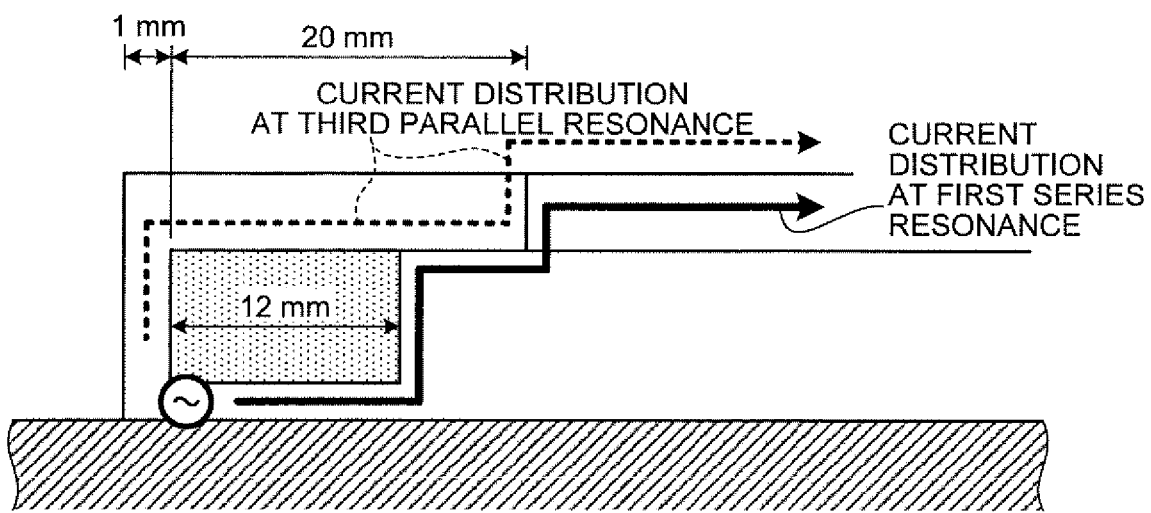
FIG. 30 is an exemplary schematic diagram for explaining resonance that occurs in the analytical model of FIG. 27 in the fourth embodiment.
Figure 31:
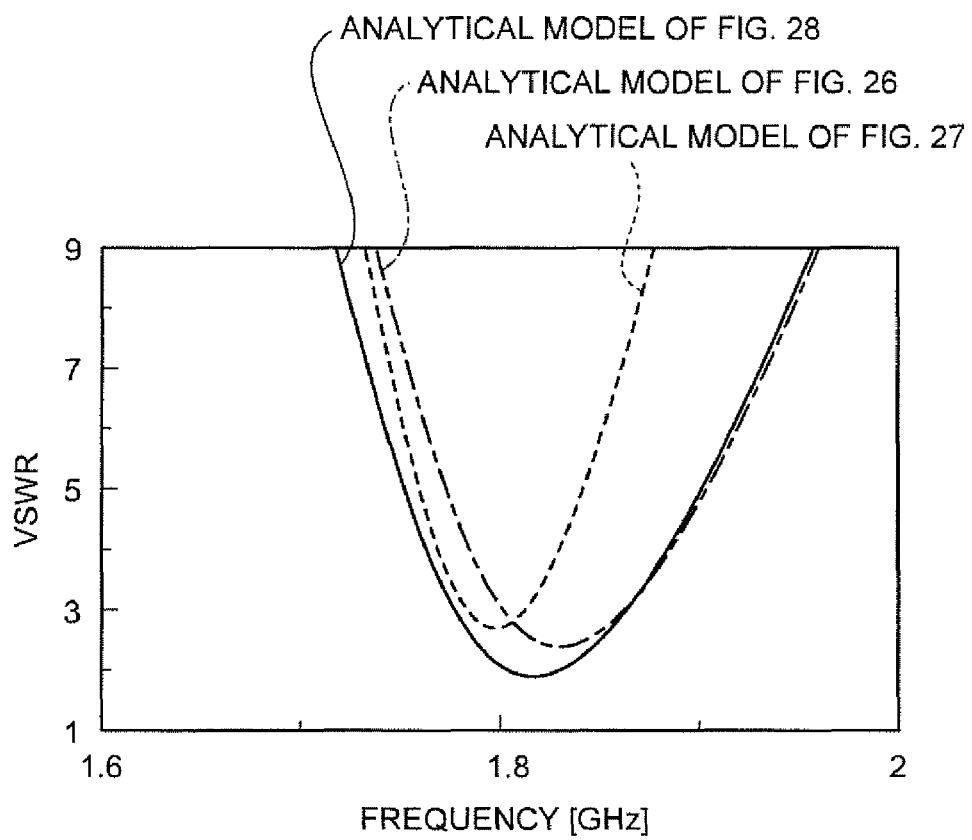
FIG. 31 is an exemplary graph of results of analysis on VSWR characteristics over a first resonant frequency band in the analytical models of FIGS. 26 to 28 in the fourth embodiment.

With reference to FIGS. 29 to 31, a description will then be given of the results of analysis on the antenna characteristics of the analytical models illustrated in FIGS. 26 to 28. FIG. 29 is a schematic diagram for explaining resonance that occurs in the analytical model of FIG. 26. FIG. 30 is a schematic diagram for explaining resonance that occurs in the analytical model of FIG. 27. FIG. 31 is a graph of results of analysis on voltage standing wave ratio (VSWR) characteristics over the first resonant frequency band in the analytical models of FIGS. 26 to 28.

With reference to FIG. 29, a description will be given of the input impedance characteristics of the first resonant frequency band in the analytical model of FIG. 26. As the connection position of the short circuit element 305 shifts from the contact point 308 side to the short circuit path 301 side, the frequency of the first parallel resonance and that of the first series resonance become too close to each other as illustrated in FIG. 29. Consequently, the input impedance over the first resonant frequency band excessively rises, resulting in a narrow coverage band.

With reference to FIG. 30, a description will be given of the input impedance characteristics of the first resonant frequency band in the analytical model of FIG. 27. As the connection position of the short circuit element 305 shifts from the contact point 308 side to the first open-ended element 302 side, the frequency of third parallel resonance and that of the first series resonance become too close to each other as illustrated in FIG. 30. Consequently, the input impedance over the first resonant frequency band excessively rises, resulting in a narrow coverage band.

As described above, the first resonant frequency band is affected by the first parallel resonance, the first series resonance, and the third parallel resonance depending on the connection position of the short circuit element 305. By setting the connection position of the short circuit element 305 near the contact point 308, a favorable balance is achieved between the first parallel resonance, the first series resonance and the third parallel resonance, and the first resonant frequency band can be widened.

It can be seen from the VSWR characteristics illustrated in FIG. 31 that the VSWR is lower and the first resonant frequency band is wider for the analytical model of FIG. 28 compared to the analytical models of FIGS. 26 and 27. This indicates that, by setting the connection position of the short circuit element 305 near the contact point 308, the first resonant frequency band widens.

Described below is an antenna device according to a fifth embodiment of the invention. In the fifth embodiment, the distance between the edge of the feed side element on the GND side and the GND is changed to adjust the inductivity of the input impedance. The antenna device of the fifth embodiment is of basically the same configuration as the antenna device of the fourth embodiment, and thus only the difference between the two will be described.

Figure 32:
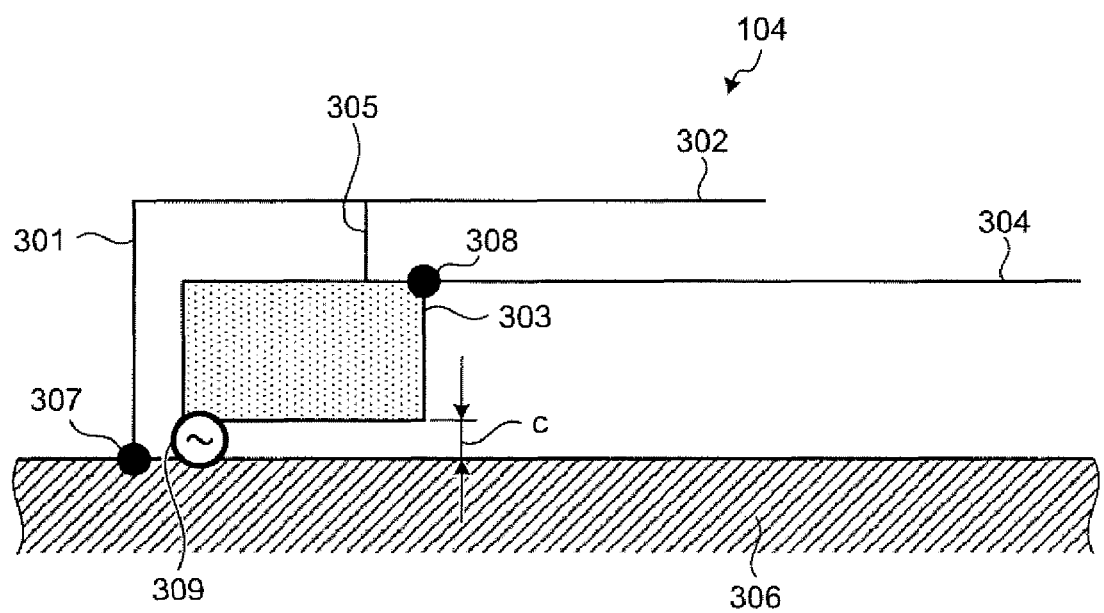
FIG. 32 is an exemplary schematic diagram of an antenna device according to a fifth embodiment of the invention.

FIG. 32 is a schematic diagram of the antenna device according to the fifth embodiment. The feed side element 303 is located between the first open-ended element 302 and the GND 306, and is spaced apart from the GND 306 by a distance c equal to or less than substantially a hundredth of the wavelength of the second resonant frequency. For example, if the second resonant frequency is 860 MHz, the feed side element 303 extends substantially parallel to the GND 306 with a space therebetween equal to or less than 3 mm, substantially a hundredth of wavelength $\lambda$=348 mm.

In the following, a description will be given of analytical models of the antenna device 104 having different distances c and results of analysis on the antenna characteristics.

Figure 33:
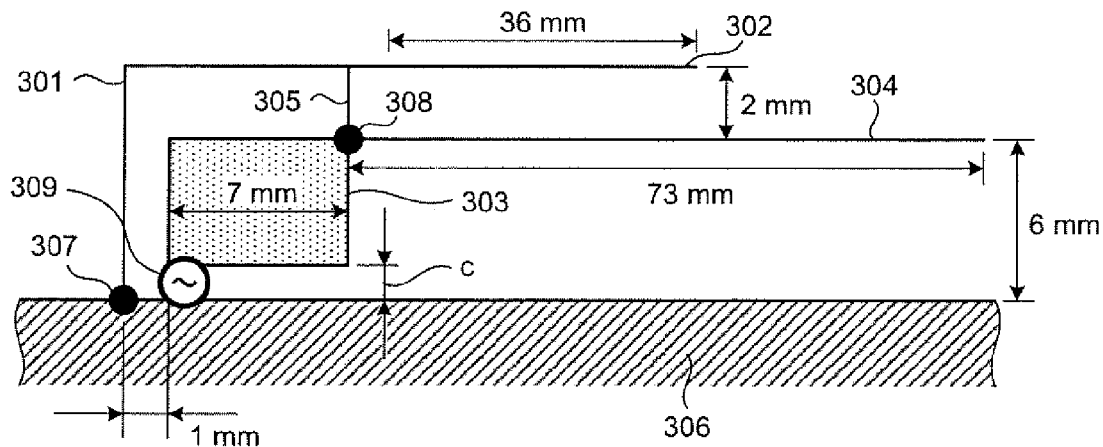
FIG. 33 is an exemplary diagram of a specific form of an analytical model in the fifth embodiment.

With reference to FIG. 33, a description will first be given of three analytical models the antenna characteristics of which are analyzed. FIG. 33 is a diagram illustrating a specific form of the analytical models. The analytical models of FIG. 33 are designed such that the first resonant frequency band is about 1.8 GHz and the second resonant frequency band is about 900 MHz. The analytical models are basically similar to that of the antenna device according to the fourth embodiment except for the distance between the feed side element 303 and the GND 306. Therefore, their description will not be repeated.

In the first analytical model, the distance c is 1 mm. In the second analytical model, the distance c is 2 mm. In the third analytical model, the distance c is 3 mm.

Figure 34:
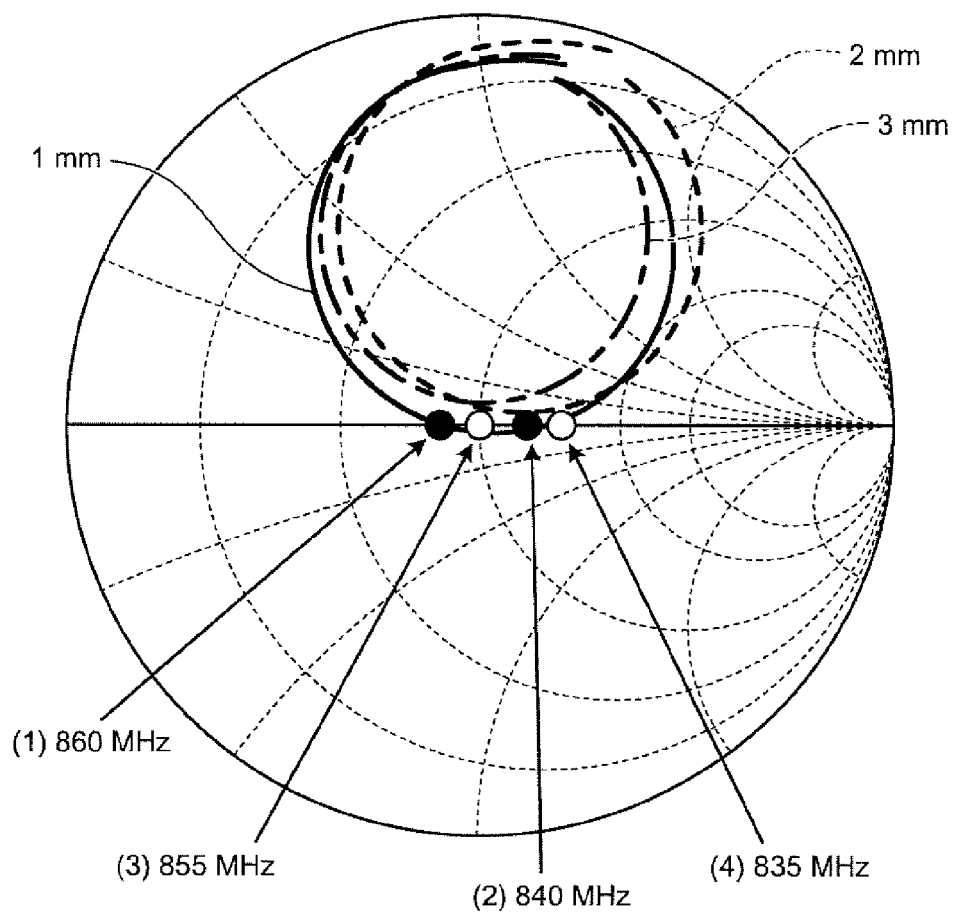
FIG. 34 is an exemplary Smith chart of the antenna characteristics of the analytical model of FIG. 33 in the fifth embodiment.

With reference to FIG. 34, a description will then be given of the antenna characteristics of the above analytical models. The Smith chart of FIG. 34 represents the impedance variation of the analytical models of FIG. 33 when the frequency signal fed from the feed point 309 is changed in a range of 700 to 1200 MHz.

The plot of the impedance of the first analytical model (c=1 mm) crosses the horizontal axis of the Smith chart at (1) 860 MHz and (2) 840 MHz. This represents the occurrence of the second parallel resonance and the second series resonance. The plot of the impedance of the second analytical model (c=2 mm) crosses the horizontal axis of the Smith chart at (3) 855 MHz and (2) 835 MHz. This also represents the occurrence of the second parallel resonance and the second series resonance. On the other hand, the plot of the impedance of the third analytical model (c=3 mm) does not cross the horizontal axis of the Smith chart, and gives no indication of the occurrence of the second parallel resonance and the second series resonance.

As just described, by reducing the distance between the feed side element 303 and the GND 306, the inductivity of the input impedance of the antenna device can be lowered (the capacitance can be increased), and thus favorable impedance characteristics can be obtained in the first and second resonant frequency bands. According to the fifth embodiment, the third analytical model is used as a reference. Since c=3 mm is a value substantially a hundredth of wavelength $\lambda$=348 mm of the second resonant frequency (860 MHz), the feed side element 303 is spaced apart from the GND 306 by a distance equal to or less than substantially a hundredth of the wavelength of the second resonant frequency.

Described below is an antenna device 3800 according to a sixth embodiment of the invention. The antenna device 3800 further comprising a parasitic element 3801 near the feed side element 303 increases its resonant frequencies. Otherwise, the antenna device 3800 is of basically the same configuration as the antenna device of the fifth embodiment, and thus only the difference between the two will be described.

Figure 35:
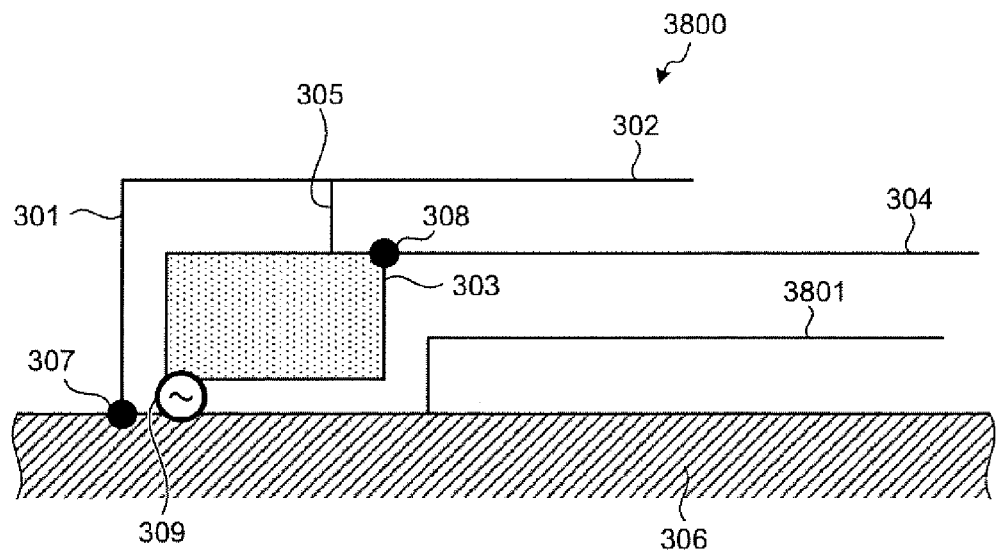
FIG. 35 is an exemplary schematic diagram of an antenna device according to a sixth embodiment of the invention.

FIG. 35 is a schematic diagram of the antenna device 3800 according to the sixth embodiment. As illustrated in FIG. 35, the antenna device 3800 is provided with the parasitic element 3801 between the second open-ended element 304 and the GND 306.

In the following, a description will be given of an analytical model of the antenna device 3800 according to the sixth embodiment and results of analysis on the antenna characteristics.

Figure 36:
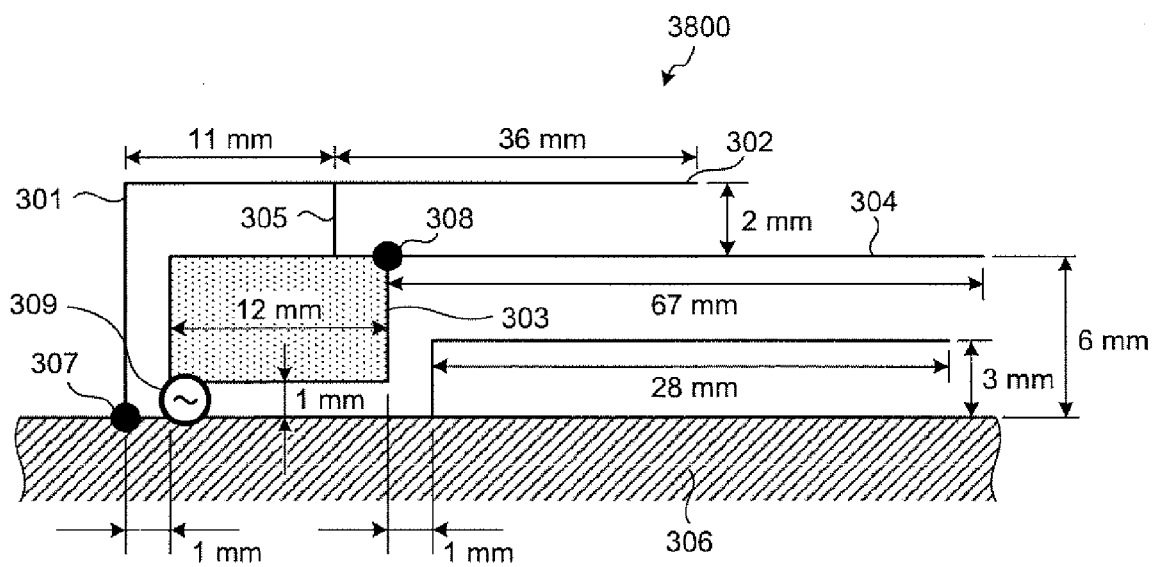
FIG. 36 is an exemplary diagram of an analytical model of the antenna device comprising a parasitic element in the sixth embodiment.

With reference to FIG. 36, a description will first be given of the analytical model the antenna characteristics of which are analyzed. FIG. 36 is a schematic diagram of the analytical model of the antenna device 3800 further comprising the parasitic element. The analytical model of FIG. 36 is designed such that the first resonant frequency band is about 1.8 GHz and the second resonant frequency band is about 900 MHz. The analytical model is basically similar to that of the antenna device according to the fifth embodiment except for the presence of the parasitic element 3801. Therefore, its description will not be repeated.

The parasitic element 3801 extends from a position near the feed side element 303 vertically with respect to the GND 306, then bends, and extends parallel to the GND 306. In other words, the parasitic element 3801 extends in the direction in which the second open-ended element 304 extends.

Figure 37:
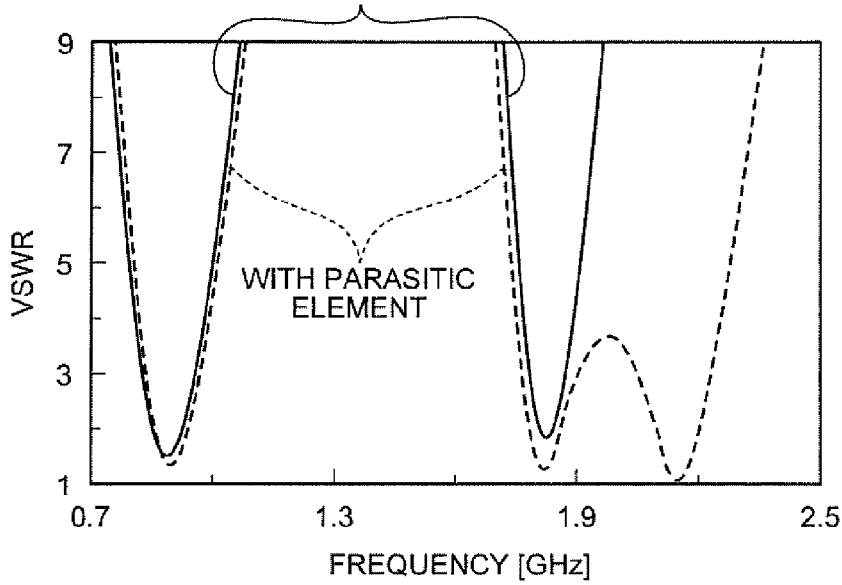
FIG. 37 is an exemplary graph of results of analysis on VSWR characteristics of an analytical model having no parasitic element and one having the parasitic element in the sixth embodiment.
Figure 38:
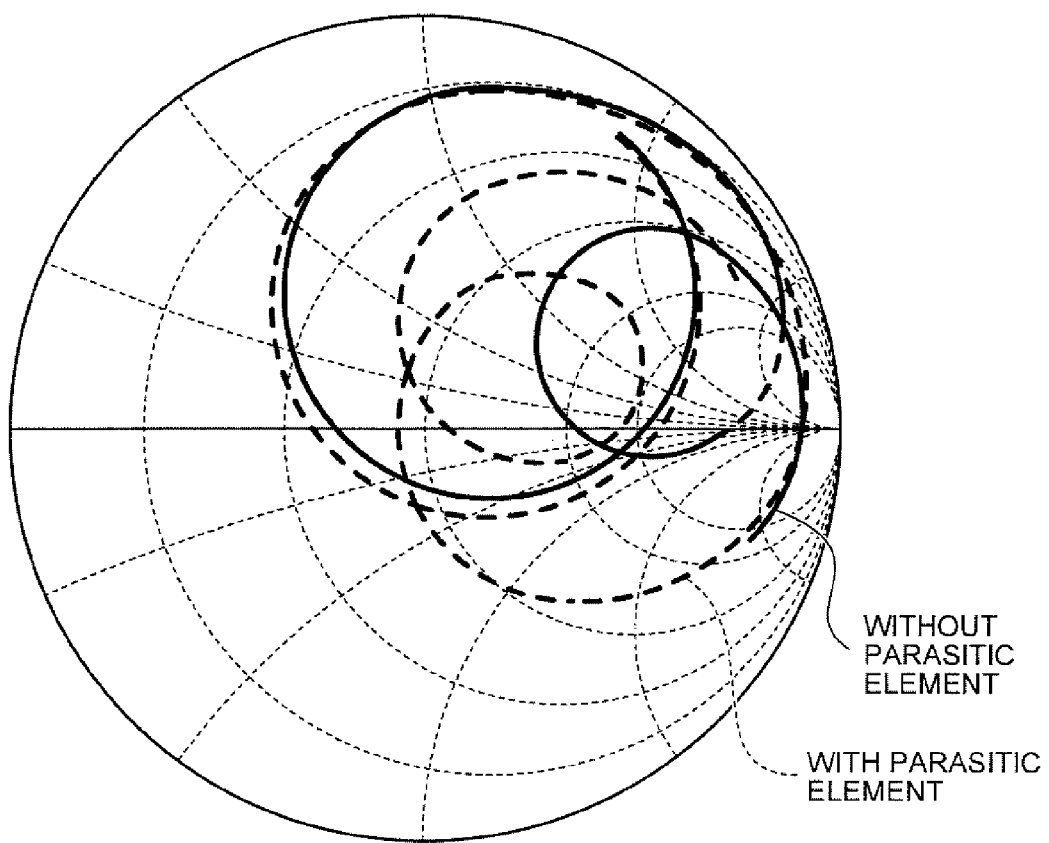
FIG. 38 is an exemplary Smith chart of the antenna characteristics of an analytical model having the parasitic element and one not having the parasitic element in the sixth embodiment.

With reference to FIGS. 37 and 38, a description will then be given of the antenna characteristics of an analytical model having no parasitic element and the analytical model of FIG. 36 having the parasitic element. FIG. 37 is a graph of results of analysis on VSWR characteristics of the analytical model having no parasitic element and one having the parasitic element. The Smith chart of FIG. 38 represents the impedance variation of the analytical models of FIG. 37 when the frequency signal fed from the feed point 309 is changed in a range of 700 to 2500 MHz.

With reference to FIG. 37, a description will be given of the results of analysis on VSWR characteristics of the analytical model having no parasitic element and the analytical model of the antenna device 3800 having the parasitic element 3801 illustrated in FIG. 36. As illustrated in FIG. 37, for both the analytical model having no parasitic element and the analytical model of the antenna device 3800 having the parasitic element 3801, the VSWR is low at the second resonant frequency band (about 0.9 GHz) as well as the first resonant frequency band (about 1.8 GHz). This indicates that favorable input impedance can be obtained at the respective resonant frequencies. Further, for the analytical model of the antenna device 3800 having the parasitic element 3801, the VSWR is low at a new resonant frequency band (about 2.2 GHz). This indicates an increase in the number of resonant frequencies due to the parasitic element 3801.

Besides, referring to FIG. 38, for the analytical model having no parasitic element, there are two series resonance points on the plot on the Smith chart. On the other hand, for the analytical model of the antenna device 3800 having the parasitic element 3801, there are three series resonance points on the plot on the Smith chart. This also indicates an increase in the number of resonant frequencies due to the parasitic element 3801.

As described above, according to the sixth embodiment, the antenna device further comprises the parasitic element near the feed side element. Thus, the number of resonant frequencies increases, and the antenna device can further be of multiple resonance.

Described below is an antenna device 4200 according to a seventh embodiment of the invention. The antenna device 4200 comprise, in place of the short circuit path 301, a short circuit path 4201 having a projection to adjust the resonant frequencies and the input impedance at the resonant frequencies. Otherwise, the antenna device 4200 is of basically the same configuration as the antenna device of the fifth embodiment, and thus only the difference between the two will be described.

Figure 39:
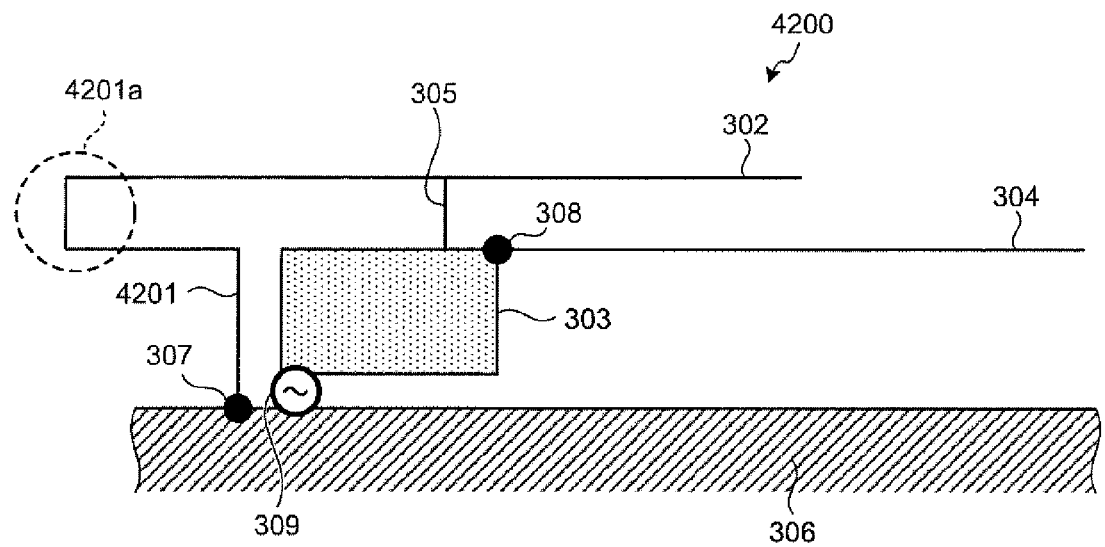
FIG. 39 is an exemplary schematic diagram of an antenna device comprising a short circuit path having a projection in the seventh embodiment.

With reference to FIG. 39, a description will be given of the antenna device 4200 provided with the short circuit path 4201 having such a projection. FIG. 39 is a schematic diagram of the antenna device 4200 comprising the short circuit path 4201 having a projection 4201a.

The short circuit path 4201 of the antenna device 4200 according to the seventh embodiment bends at least three points to form the projection 4201a on a part thereof. More specifically, according to the seventh embodiment, the short circuit path 4201 bends at three points to form the projection 4201a on a part thereof that extends vertically from the ground point 307 with respect to the GND 306.

Figure 40:
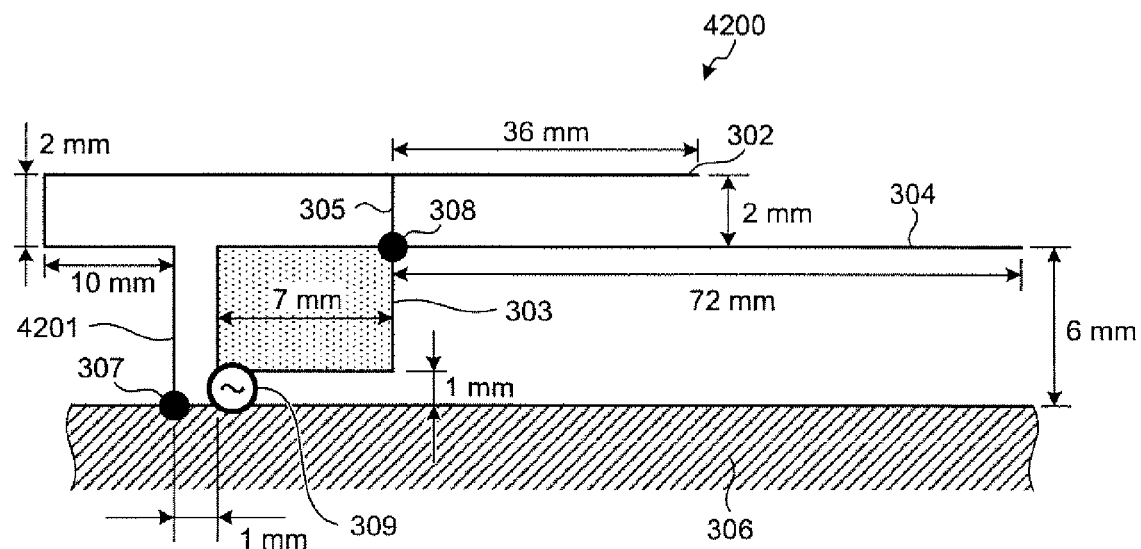
FIG. 40 is an exemplary diagram of a specific form of an analytical model of the antenna device of FIG. 39 in the seventh embodiment.

In the following, a description will be given of an analytical model of the antenna device 4200 according to the seventh embodiment and results of analysis on the antenna characteristics with reference to FIGS. 40 and 41. FIG. 40 is a diagram of a specific form of an analytical model of the antenna device 4200 provided with the short circuit path 4201 having the projection 4201a. The analytical model of FIG. 40 is designed such that the first resonant frequency band is about 1.8 GHz and the second resonant frequency band is about 900 MHz. The Smith chart of FIG. 41 represents the input impedance of the analytical model of FIG. 40 at 700 to 2500 MHz.

With reference to FIG. 40, a description will first be given of the analytical model the antenna characteristics of which are analyzed. The analytical model is basically similar to that of the antenna device according to the sixth embodiment except for the short circuit path 4201. Therefore, its description will not be repeated. As illustrated in FIG. 40, the short circuit path 4201 extends vertically from the ground point 307 with respect to the GND 306, and then bends in the direction opposite the direction in which the first open-ended element 302 extends. The short circuit path 4201 bends and extends again vertically with respect to the GND 306, and bends once more to form the projection 4201a.

Figure 41:
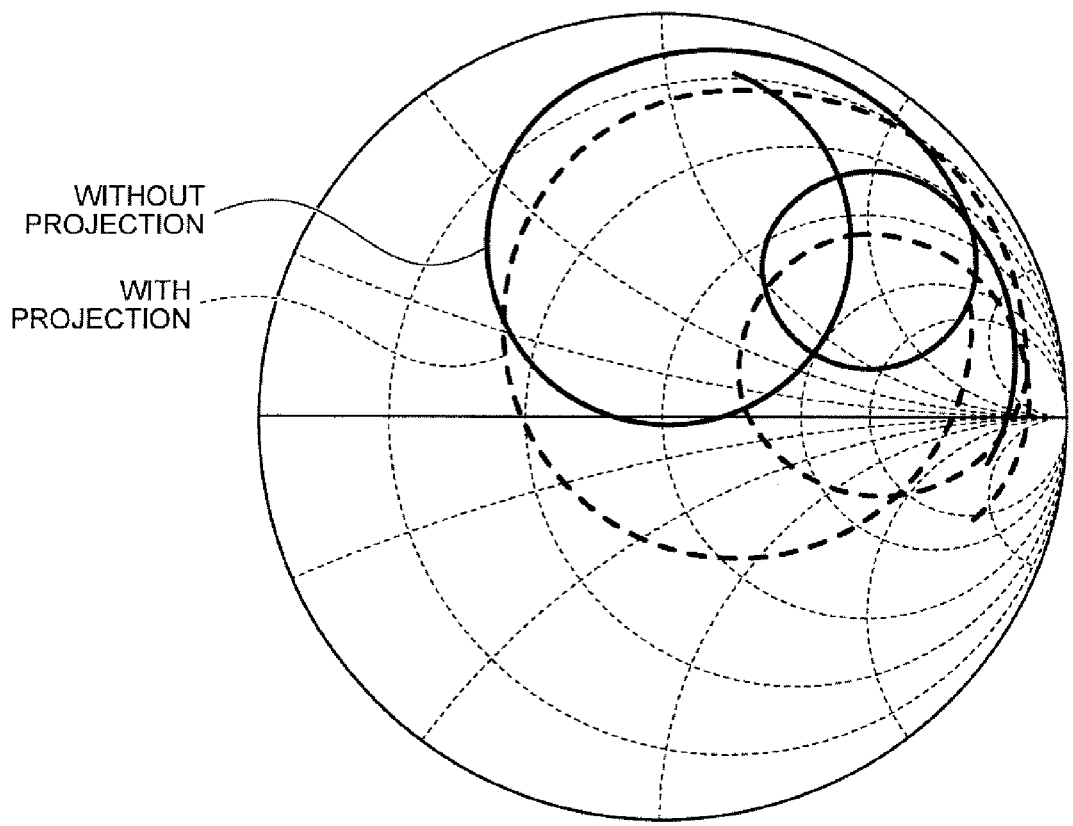
FIG. 41 is an exemplary Smith chart of the antenna characteristics of the analytical model of FIG. 40 in the seventh embodiment.

With reference to FIG. 41, a description will then be given of the antenna characteristics of the analytical model of FIG. 40. It can be seen from FIG. 41 that, for the analytical model provided with the projection, the plot on the Smith chart is close to the center of the chart, i.e., 50Ω, compared to the plot for the analytical model provided with no such a projection. It can also be seen from FIG. 41 that the plot of the impedance of the analytical model with no projection crosses the horizontal axis of the Smith chart due to neither the first parallel resonance illustrated in FIG. 11 nor the first series resonance illustrated in FIG. 12. On the other hand, the plot of the impedance of the analytical model with the projection crosses the horizontal axis of the Smith chart due to the first parallel resonance illustrated in FIG. 11 and the first series resonance illustrated in FIG. 12.

As described above, according to the seventh embodiment, a projection is formed on a part of the short circuit path, which enables adjustment of the length of the short circuit path. By adjusting the length of the short circuit path, it is possible to adjust the frequencies of the first parallel resonance and the second parallel resonance and thereby to adjust the input impedance characteristics over the first and second resonant frequency bands.

Figure 42:
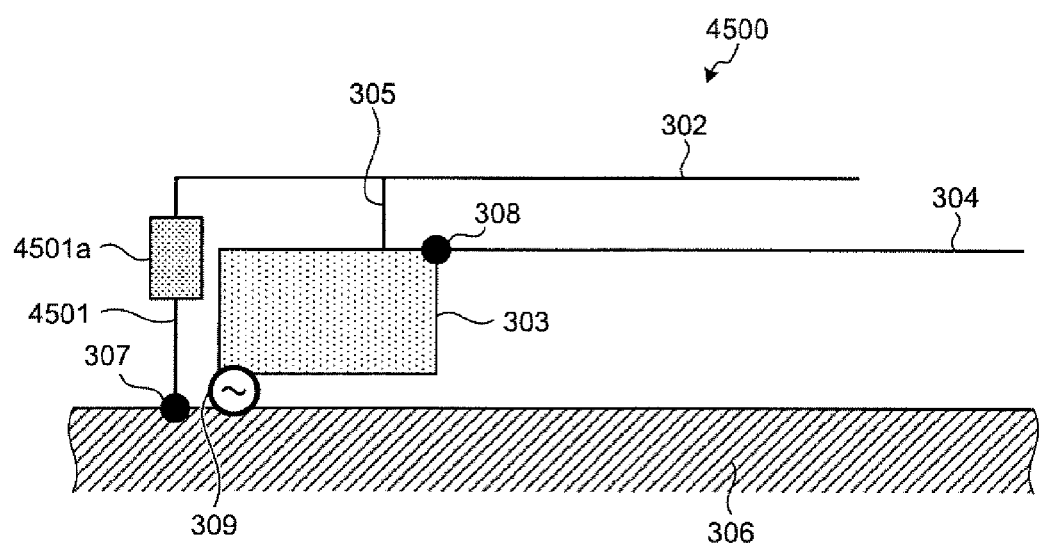
FIG. 42 is an exemplary schematic diagram of an antenna device comprising a short circuit path provided with an impedance matching circuit thereon in the eighth embodiment.

Described below is an antenna device 4500 according to an eighth embodiment of the invention. FIG. 42 is a schematic diagram of the antenna device 4500 comprising a short circuit path 4501 provided with an impedance matching circuit 4501a according to the eighth embodiment.

In the antenna device 4500 of the eighth embodiment, the impedance matching circuit 4501a, such as a chip inductor, is provided on the short circuit path 4501. The value of the chip inductor is adjusted to adjust the first and second resonant frequencies as well as the input impedance at the resonant frequencies.

Figure 43:
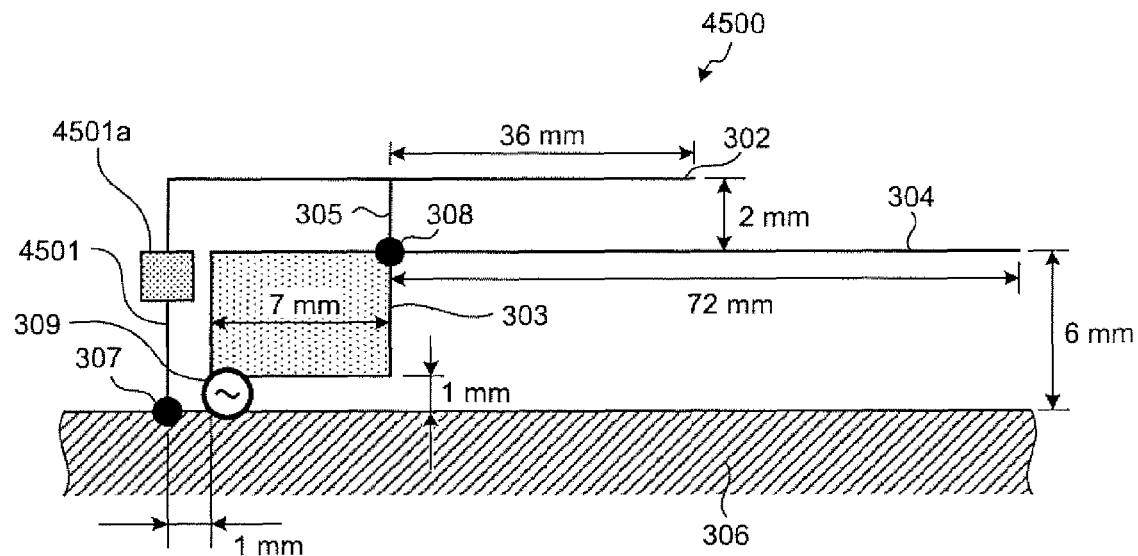
FIG. 43 is an exemplary diagram of a specific form of an analytical model of the antenna device comprising the short circuit path provided with a chip inductor thereon in the eighth embodiment.

In the following, a description will be given of an analytical model of the antenna device 4500 according to the eighth embodiment and results of analysis on the antenna characteristics with reference to FIGS. 43 and 44. FIG. 43 is a diagram of a specific form of an analytical model of the antenna device 4500 provided with the short circuit path 4501 on which is arranged the impedance matching circuit 4501a. The analytical model of FIG. 43 is designed such that the first resonant frequency band is about 1.8 GHz and the second resonant frequency band is about 900 MHz. The Smith chart of FIG. 44 represents the input impedance of the analytical model of FIG. 43 at 700 to 2500 MHz.

Figure 46:
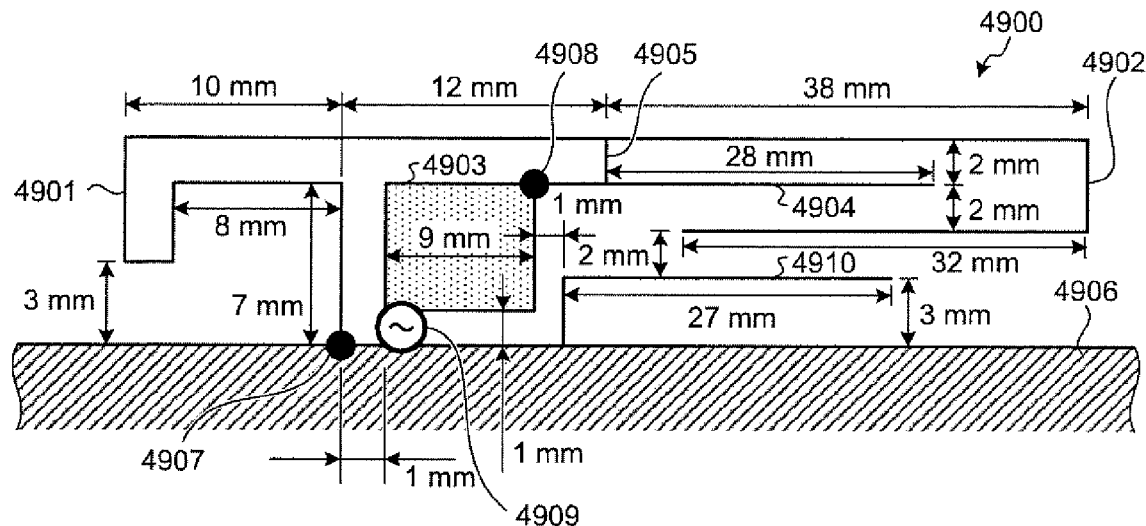
FIG. 46 is an exemplary diagram of a specific form of an antenna device in an embodiment.

With reference to FIG. 43, a description will first be given of the analytical model the antenna characteristics of which are analyzed. The analytical model is basically similar to that of the antenna device according to the sixth embodiment except for the short circuit path 4501. Therefore, its description will not be repeated. As illustrated in FIG. 46, the short circuit path 4501 is provided with a chip inductor (L=5 nH), i.e., the impedance matching circuit 4501a, on its path extending vertically from the ground point 307 with respect to the GND 306.

Figure 44:
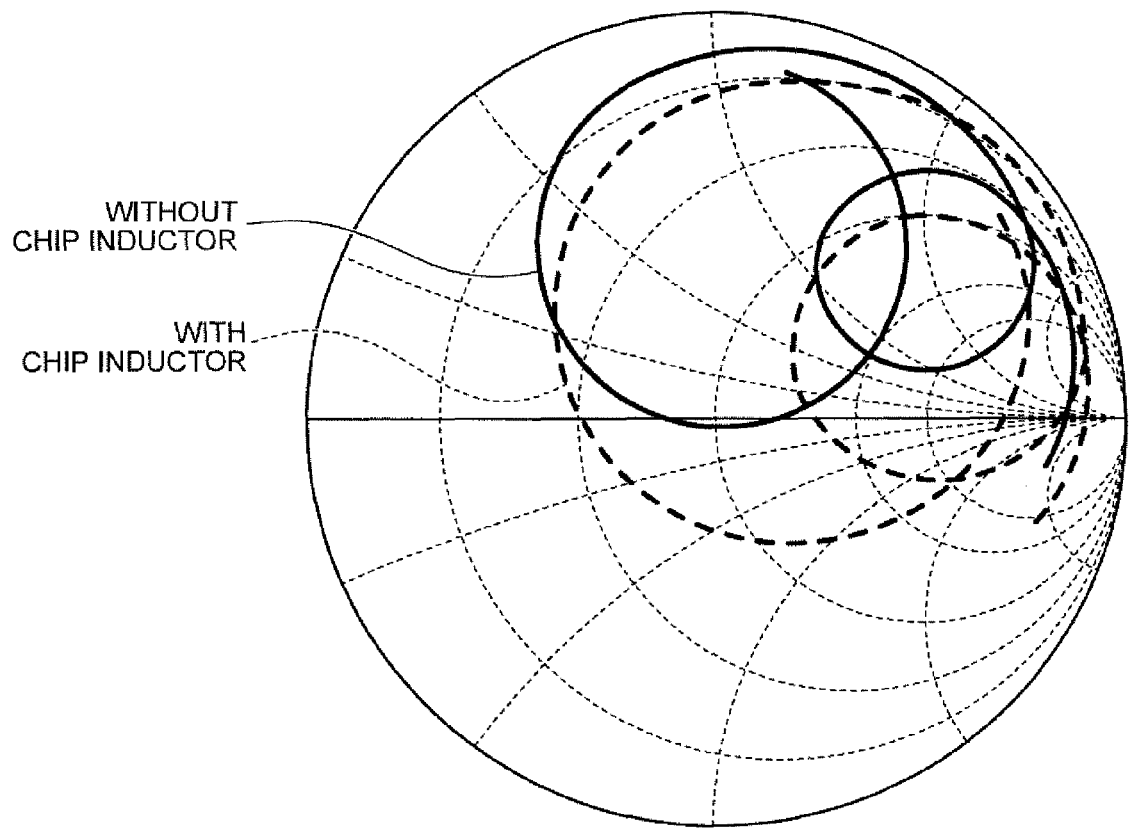
FIG. 44 is an exemplary Smith chart of the antenna characteristics of the analytical model of FIG. 43 in the eighth embodiment.

With reference to FIG. 44, a description will then be given of the antenna characteristics of the analytical model of FIG. 43. It can be seen from FIG. 44 that, for the analytical model provided with the chip inductor on the path, the plot on the Smith chart is close to the center of the chart, i.e., 50Ω, compared to the plot for the analytical model provided with no chip inductor. It can also be seen from FIG. 44 that the plot of the impedance of the analytical model with no chip inductor crosses the horizontal axis of the Smith chart due to neither the first parallel resonance illustrated in FIG. 11 nor the first series resonance illustrated in FIG. 12. On the other hand, the plot of the impedance of the analytical model with the chip inductor crosses the horizontal axis of the Smith chart due to the first parallel resonance illustrated in FIG. 11 and the first series resonance illustrated in FIG. 12.

As described above, according to the eighth embodiment, a chip inductor is arranged on the short circuit path. By adjusting the value of the chip inductor, the same effect can be achieved as in the case where a projection is formed on the short circuit path and thereby the length thereof is adjusted. That is, with the impedance matching circuit provided on the short circuit path, it is possible to adjust the first and second resonant frequencies as well as the input impedance at the resonant frequencies by adjusting the value of the impedance matching circuit.

With reference to FIGS. 45A to 45L, a description will be given of modifications of the embodiments described above. FIGS. 45A to 45L are schematic diagrams of antenna devices according to modifications of the first to eighth embodiments. The antenna devices according to the modifications are of basically the same configuration as previously described in the above embodiments, and thus only the difference from the above embodiments will be described.

Figure 45A:
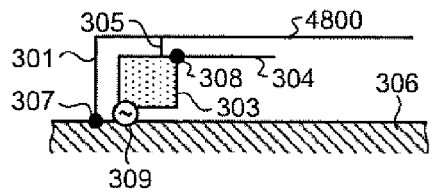
FIGS. 45A to 45L are exemplary schematic diagrams of antenna devices according to modifications of the first to seventh embodiments.
Figure 45B:
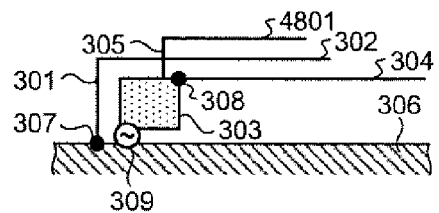
Figure 45C:
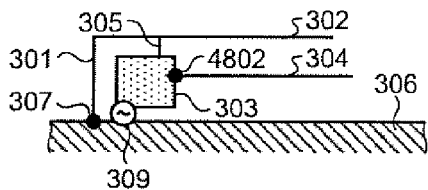
Figure 45D:
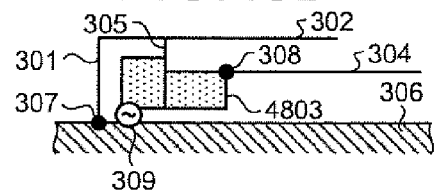
Figure 45E:
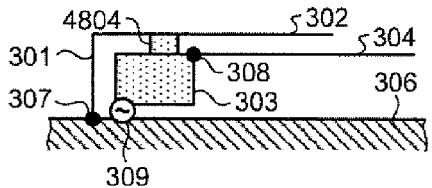
Figure 45F:
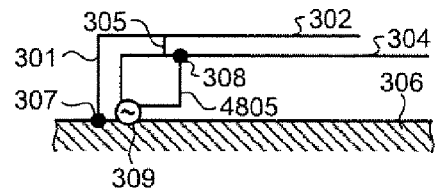
Figure 45G:
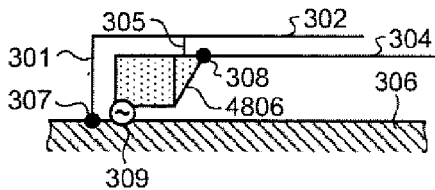
Figure 45H:
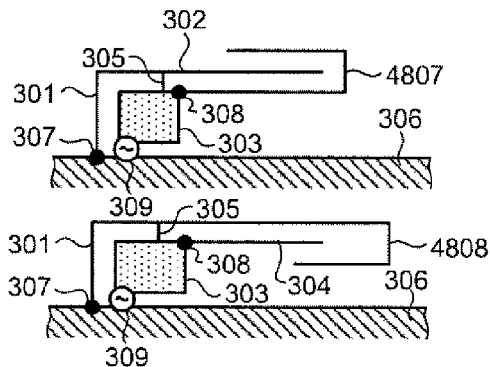
Figure 45I:
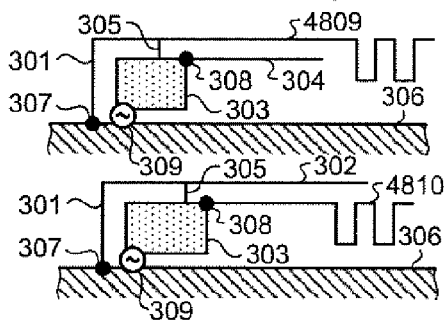
Figure 45J:
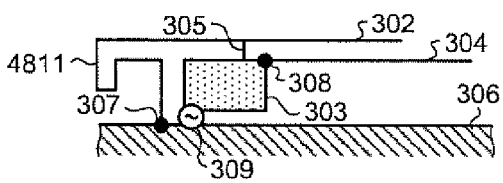
Figure 45K:
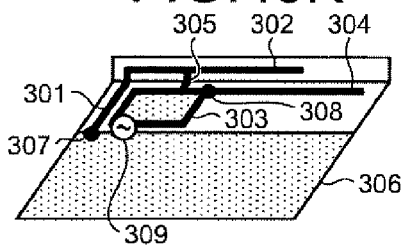
Figure 45L:
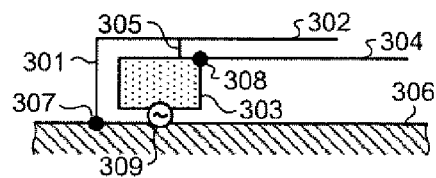

FIG. 45A illustrates a modification of the antenna device comprising a first open-ended element 4800 that is longer than the second open-ended element 304 in the direction in which they extend. FIG. 45B illustrates another modification of the antenna device further comprising an antenna element 4801 that requires power supply. FIG. 45C illustrates still another modification of the antenna device in which the second open-ended element 304 does not extend from the contact point 308 at a corner of the feed side element 303 but extends from a point 4802 on an edge of the feed side element 303. FIG. 45D illustrates still another modification of the antenna device comprising a feed side element 4803 in a distorted shape. FIG. 45E illustrates still another modification of the antenna device comprising a plate-like short circuit element 4804. FIG. 45F illustrates still another modification of the antenna device comprising a linear feed side element 4805. FIG. 45G illustrates still another modification of the antenna device comprising a feed side element 4806 in a trapezoidal shape. FIG. 45H illustrates still other modifications of the antenna device, one comprising a second open-ended element 4807 in a bent shape, the other comprising a first open-ended element 4808 in a bent shape. FIG. 45I illustrates still other modifications of the antenna device, one comprising a first open-ended element 4809 in a meander shape, the other comprising a second open-ended element 4810 in a meander shape. FIG. 45J illustrates still another modification of the antenna device comprising a short circuit path 4811 that is longer than the short circuit path 4201 of the seventh embodiment and is bent. FIG. 45K illustrates still another modification in which the antenna device of the first to eighth embodiments is folded according to the shape of the housing and is attached thereto. FIG. 45L illustrates still another modification of the antenna device in which the feed point 309 is not arranged at a corner of the feed side element 303 but is arranged on an edge thereof on the GND 306 side.

Figure 47:
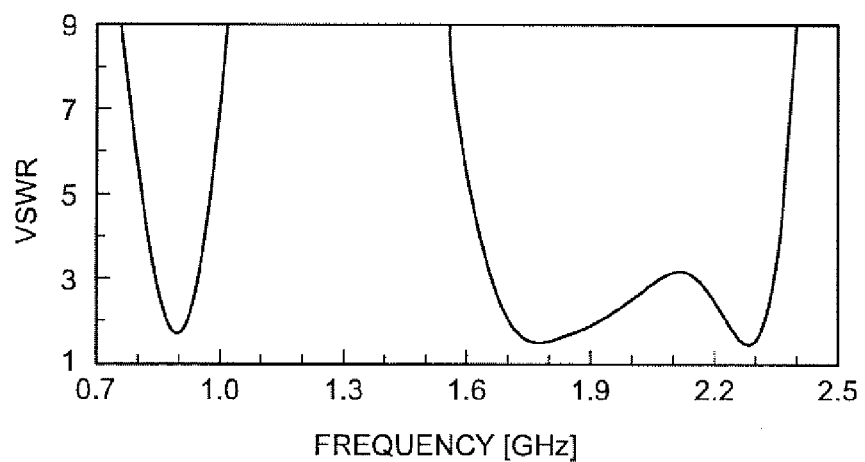
FIG. 47 is an exemplary graph of results of analysis on VSWR characteristics of the antenna device of FIG. 46 in the embodiment.

With reference to FIGS. 46 and 47, a description will be given of an antenna device 4900 as a specific example of the antenna device according to the embodiments described above. FIG. 46 is a diagram of a specific form of the antenna device 4900. FIG. 47 is a graph of results of analysis on VSWR characteristics of the antenna device 4900.

With reference to FIG. 46, a description will first be given of the configuration of the antenna device 4900. The antenna device 4900 comprises a short circuit path 4901, a first open-ended element 4902, a feed side element 4903, a second open-ended element 4904, a short circuit element 4905, a GND 4906, and a parasitic element 4910. The short circuit path 4901 extends from a ground point 4907 and has an L-shaped bent portion. The first open-ended element 4902 is connected to a second end of the short circuit path 4901 and is bent in an open square shape. The feed side element 4903 is a plate-like element, a corner of which is connected to a feed point 4909. The second open-ended element 4904 is connected to a contact point 4908 at a corner of the feed side element 4903 diagonally opposite the corner connected to the feed point 4909. The short circuit element 4905 connects between a first end of the first open-ended element 4902 and the second open-ended element 4904. The parasitic element 4910 is located between the second open-ended element 4904 and the GND 4906.

With reference to FIG. 47, a description will then be given of results of analysis on VSWR characteristics of the antenna device 4900.

As illustrated in FIG. 47, the antenna device 4900 achieves VSWRs equal to or lower than 3 in the resonant frequency bands of the first resonant frequency (about 1.8 GHz), the second resonant frequency (about 0.9 GHz), and the third resonant frequency (about 2.3 GHz). This indicates that favorable input impedance characteristics can be obtained at each of the resonant frequencies.

As described above, the antenna device 4900 can achieve the same effect as previously described in the above embodiments. The antenna device 4900 is a planar antenna in which is formed a planar pattern of elements, and is designed for use in third generation mobile phone handsets. The antenna device 4900 covers the 800 MHz band (825 to 960 MHz) and the 2 GHz band (1710 to 2170 MHz).

Figure 48:
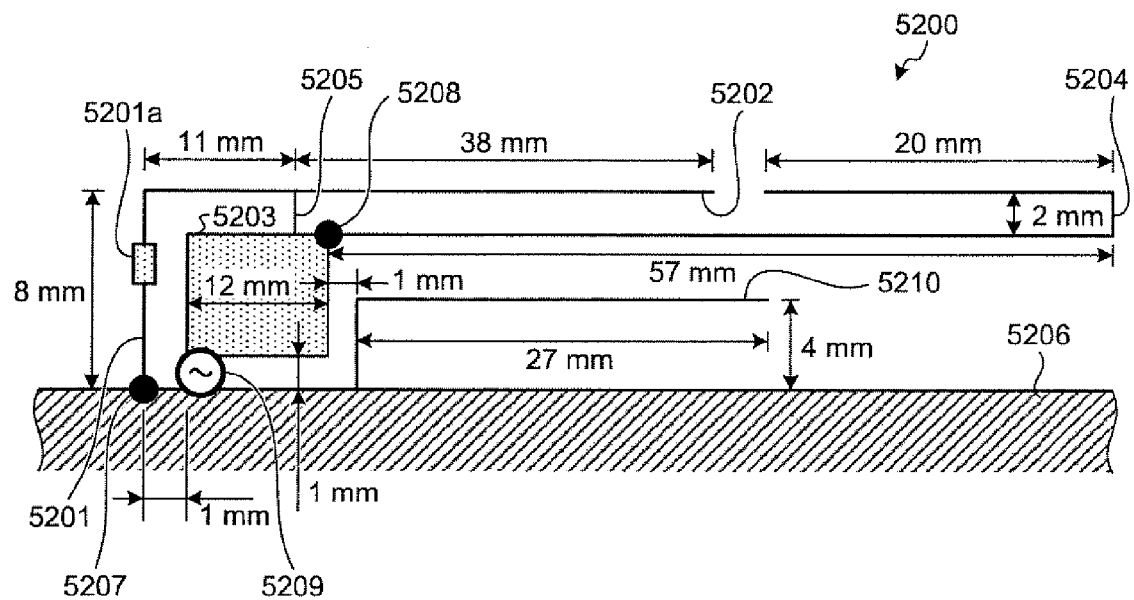
FIG. 48 is an exemplary diagram of a specific form of an antenna device in another embodiment.
Figure 49:
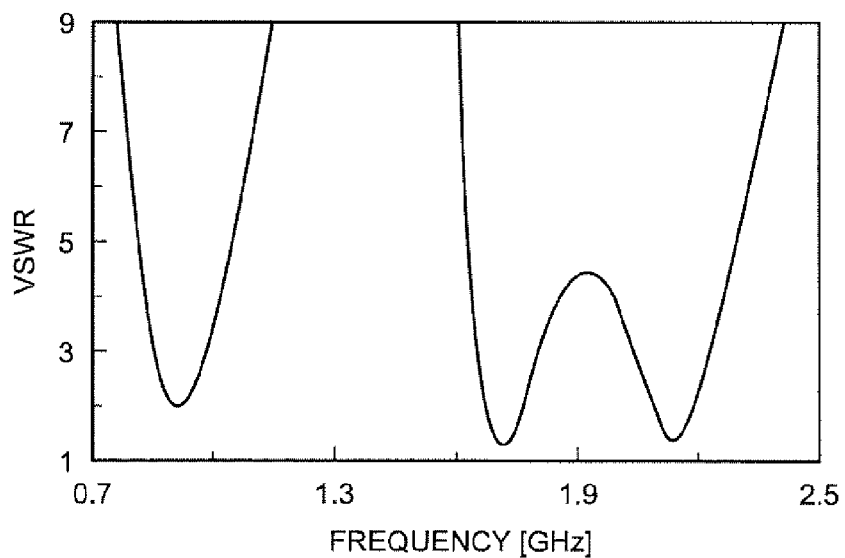
FIG. 49 is an exemplary graph of results of analysis on VSWR characteristics of the antenna device of FIG. 48 in the embodiment.
Figure 50:
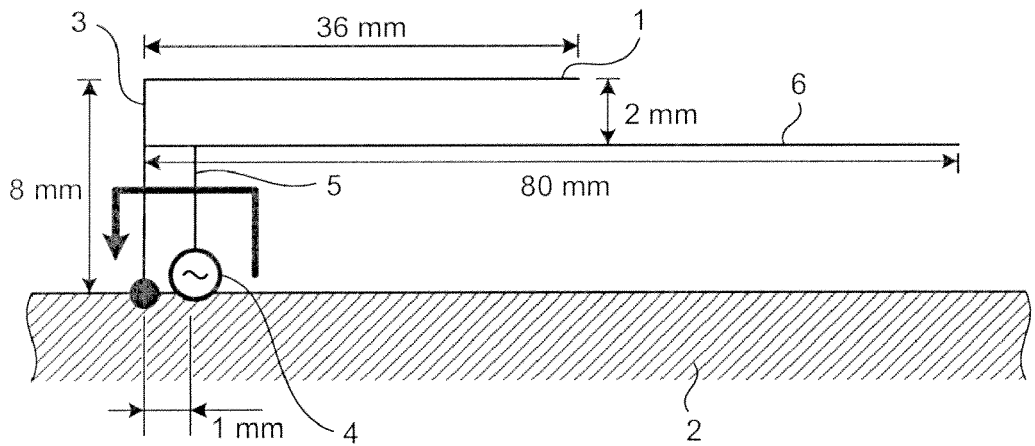
FIG. 50 is an exemplary schematic diagram of an antenna designed referring to the basic structure of an inverted-F antenna according to a conventional technology.
Figure 51:
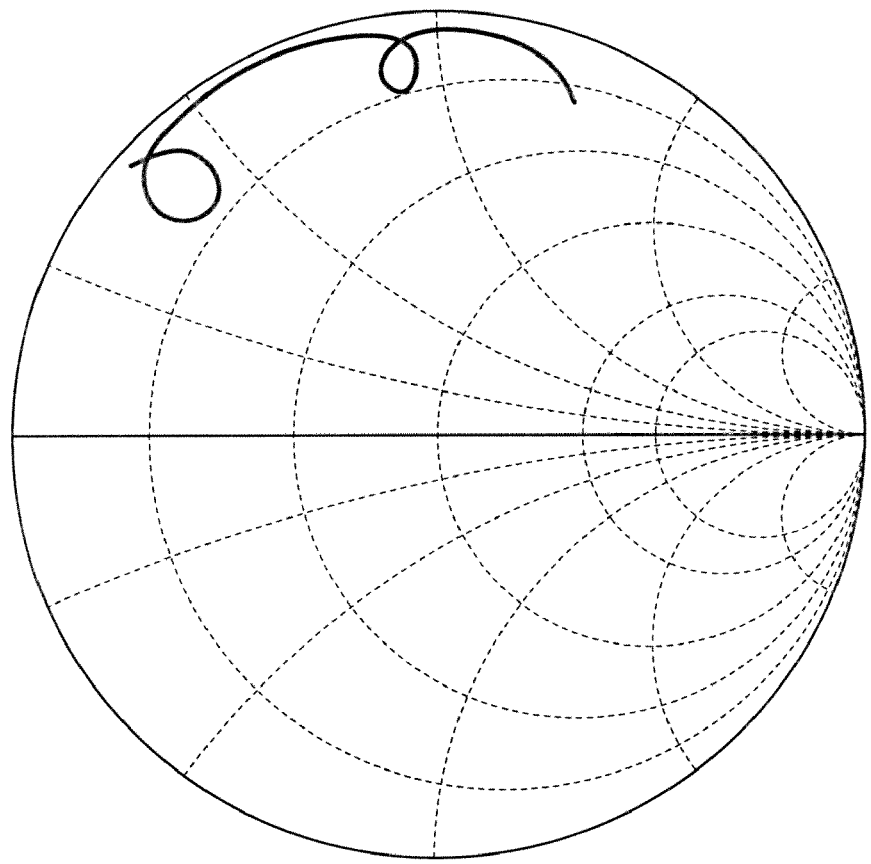
FIG. 51 is an exemplary Smith chart of the impedance variation of the inverted-F antenna illustrated in FIG. 50.

With reference to FIGS. 48 and 49, a description will be given of an antenna device 5200 as another specific example of the antenna device according to the embodiments described above. FIG. 48 is a diagram of a specific form of the antenna device 5200. FIG. 49 is a graph of results of analysis on VSWR characteristics of the antenna device 5200.

With reference to FIG. 48, a description will first be given of the configuration of the antenna device 5200. The antenna device 5200 comprises a short circuit path 5201, a first open-ended element 5202, a feed side element 5203, a second open-ended element 5204, a short circuit element 5205, a GND 5206, and a parasitic element 5210. The short circuit path 5201 is provided with a chip inductor 5201a (L=5 nH) on a portion extending from a ground point 5207. The first open-ended element 5202 is connected to a second end of the short circuit path 5201. The feed side element 5203 is a plate-like element, a corner of which is connected to a feed point 5209. The second open-ended element 5204 is connected to a contact point 5208 at a corner of the feed side element 5203 diagonally opposite the corner connected to the feed point 5209. The short circuit element 5205 connects between a first end of the first open-ended element 5202 and a point on an edge of the feed side element 5203 close to the contact point 5208. The parasitic element 5210 is located between the second open-ended element 5204 and the GND 5206.

With reference to FIG. 49, a description will then be given of results of analysis on VSWR characteristics of the antenna device 5200.

As illustrated in FIG. 49, the antenna device 5200 achieves VSWRs equal to or lower than 3 in the resonant frequency bands of the first resonant frequency (about 1.8 GHz), the second resonant frequency (about 0.9 GHz), and the third resonant frequency (about 2.3 GHz). This indicates that favorable input impedance characteristics can be obtained at each of the resonant frequencies.

As described above, the antenna device 5200 can achieve the same effect as previously described in the above embodiments. The antenna device 5200 is a planar antenna in which is formed a planar pattern of elements, and is designed for use in third generation mobile phone handsets. The antenna device 5200 covers the 800 MHz band (825 to 960 MHz) and the 2 GHz band (1710 to 2170 MHz).

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An antenna device comprising:
   a short circuit path a first end of which is connected to a ground point that is located near a feed point;
   a first open-ended element that has a second end being open, and extends from a second end of the short circuit path;
   a feed side element that extends from near the feed point in a direction in which the first open-ended element extends to have an edge close to ground;
   a second open-ended element that is connected to the feed side element, has a second end being open, and extends from a contact point connected to the feed side element in the direction in which the first open-ended element extends, the contact point being a second end of the feed side element; and
   a short circuit element that connects between a first end of the first open-ended element and either a point on an edge of the feed side element opposite the edge close to the ground or a point on the second open-ended element, wherein
   a length, from the feed point through an outer edge of the feed side element including the edge close to the ground and the short circuit element to the second end of the first open-ended element, is substantially a quarter of a wavelength of a first resonant frequency, and
   a length, from the feed point through the outer edge of the feed side element including the edge close to the ground to the second end of the second open-ended element, is substantially a quarter of a wavelength of a second resonant frequency.

2. The antenna device of claim 1, wherein the feed point is spaced apart from the ground point in the direction in which the first open-ended element extends by a distance equal to or less than substantially a twentieth of the wavelength of lower one of the first resonant frequency or the second resonant frequency.

3. The antenna device of claim 1, wherein the feed side element has a length equal to or more than substantially a fiftieth of the wavelength of lower one of the first resonant frequency or the second resonant frequency in the direction in which the first open-ended element extends.

4. The antenna device of claim 1, wherein the short circuit element connects between the first end of the first open-ended element and the point near the second end of the feed side element.

5. The antenna device of claim 4, wherein the short circuit element connects between the first end of the first open-ended element and the contact point.

6. The antenna device of claim 1, wherein
   the feed side element is located between the first open-ended element and a ground conductor, and
   the edge of the feed side element close to the ground is spaced apart from the ground conductor by a distance equal to or less than substantially a hundredth of the wavelength of lower one of the first resonant frequency or the second resonant frequency.

7. The antenna device of claim 1, further comprising a parasitic element near the feed side element.

8. The antenna device of claim 1, wherein the short circuit path bends at least three points to form a projection on a part of the short circuit path.

9. The antenna device of claim 1, further comprising an impedance matching circuit on the short circuit path.

10. Electronic equipment comprising a housing having a built-in antenna device, the antenna device comprising:
    a short circuit path a first end of which is connected to a ground point that is located near a feed point;
    a first open-ended element that has a second end being open, and extends from a second end of the short circuit path;
    a feed side element that extends from near the feed point in a direction in which the first open-ended element extends to have an edge close to ground;
    a second open-ended element that is connected to the feed side element, has a second end being open, and extends from a contact point connected to the feed side element in the direction in which the first open-ended element extends, the contact point being a second end of the feed side element; and
    a short circuit element that connects between a first end of the first open-ended element and either a point on an edge of the feed side element opposite the edge close to the ground or a point on the second open-ended element, wherein
    a length, from the feed point through an outer edge of the feed side element including the edge close to the ground and the short circuit element to the second end of the first open-ended element, is substantially a quarter of a wavelength of a first resonant frequency, and
    a length, from the feed point through the outer edge of the feed side element including the edge close to the ground to the second end of the second open-ended element, is substantially a quarter of a wavelength of a second resonant frequency.

* * * * *